United States Patent
Nishizawa

(10) Patent No.: US 7,606,472 B2
(45) Date of Patent: Oct. 20, 2009

(54) VIDEO STREAM DATA RECORDING APPARATUS

(75) Inventor: Hideta Nishizawa, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 854 days.

(21) Appl. No.: 10/852,168

(22) Filed: May 25, 2004

(65) Prior Publication Data
US 2004/0240863 A1    Dec. 2, 2004

(30) Foreign Application Priority Data

May 30, 2003 (JP) ............... 2003-154904
Jun. 10, 2003 (JP) ............... 2003-165087

(51) Int. Cl.
H04N 5/00 (2006.01)
H04N 5/91 (2006.01)
H04N 5/93 (2006.01)
H04N 7/26 (2006.01)

(52) U.S. Cl. ............... 386/125; 386/52; 386/68; 386/70; 386/95; 386/111; 386/126

(58) Field of Classification Search ........... 386/69–104, 386/125, 68, 111, 126, E9.013, 52; 348/E5.007, 348/E5.009, E5.108
See application file for complete search history.

(56) References Cited

U.S. PATENT DOCUMENTS

| | | | | |
|---|---|---|---|---|
| 6,304,717 | B1 * | 10/2001 | Fujinami | 386/111 |
| 6,546,192 | B2 * | 4/2003 | Hisatomi et al. | 386/70 |
| 6,564,008 | B2 * | 5/2003 | Tsumagari et al. | 386/95 |
| 6,567,607 | B2 * | 5/2003 | Ando et al. | 386/95 |
| 7,212,726 | B2 * | 5/2007 | Zetts | 386/68 |
| 7,373,075 | B1 | 5/2008 | Ando et al. | 386/68 |
| 2001/0009604 | A1 * | 7/2001 | Ando et al. | 386/95 |
| 2003/0059196 | A1 | 3/2003 | Ando et al. | 386/20 |
| 2003/0113097 | A1 | 6/2003 | Shibutani | 386/52 |
| 2004/0062516 | A1 | 4/2004 | Takeda et al. | 386/4 |
| 2006/0093315 | A1 * | 5/2006 | Kelly et al. | 386/52 |

FOREIGN PATENT DOCUMENTS

| | | |
|---|---|---|
| CN | 1252204 A | 5/2005 |
| JP | 2000-138896 | 5/2000 |
| JP | 2000-268537 | 9/2000 |
| JP | 2001-52448 | 2/2001 |
| JP | 2003-189226 | 7/2003 |
| WO | WO 00/55854 | 9/2000 |

* cited by examiner

Primary Examiner—Thai Tran
Assistant Examiner—Syed Y Hasan
(74) Attorney, Agent, or Firm—Fitzpatrick, Cella, Harper & Scinto

(57) ABSTRACT

A recording apparatus which effects recording after performing padding an area between an end position of AV data and the end position of a sector, with NULL packet data having no image information, no speech information, and no system information, which are specified by the MPEG standard so that a decoder does not perform decoding reproducing operation even if the area transferred to the decoder in the case where the end position of the effective AV data of an MPEG stream at a stop point of recording finish does not correspond to the end of the sector which is a unit of disk reading and-writing access, when the MPEG2 stream data is recorded on a disk-shaped recording medium.

8 Claims, 33 Drawing Sheets

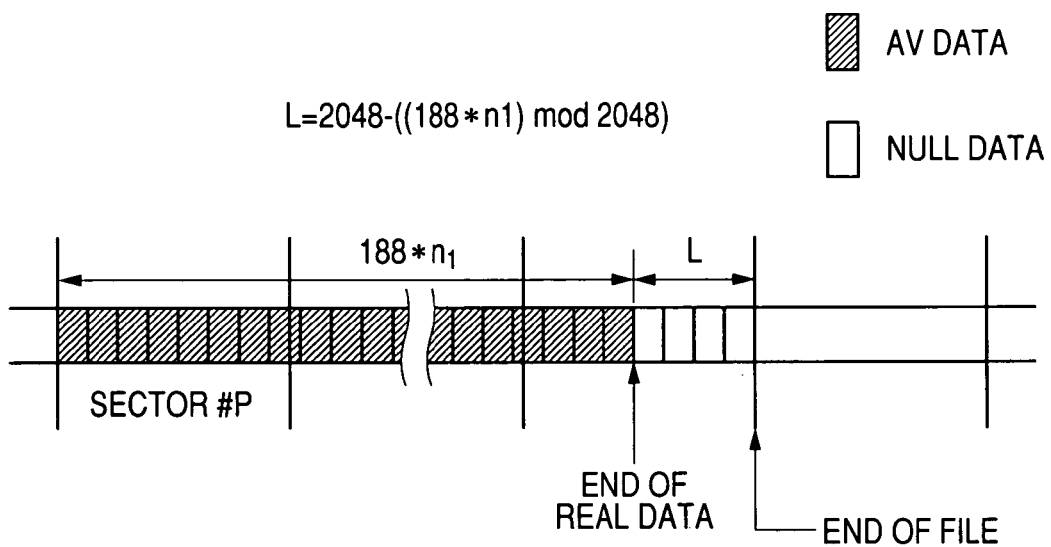

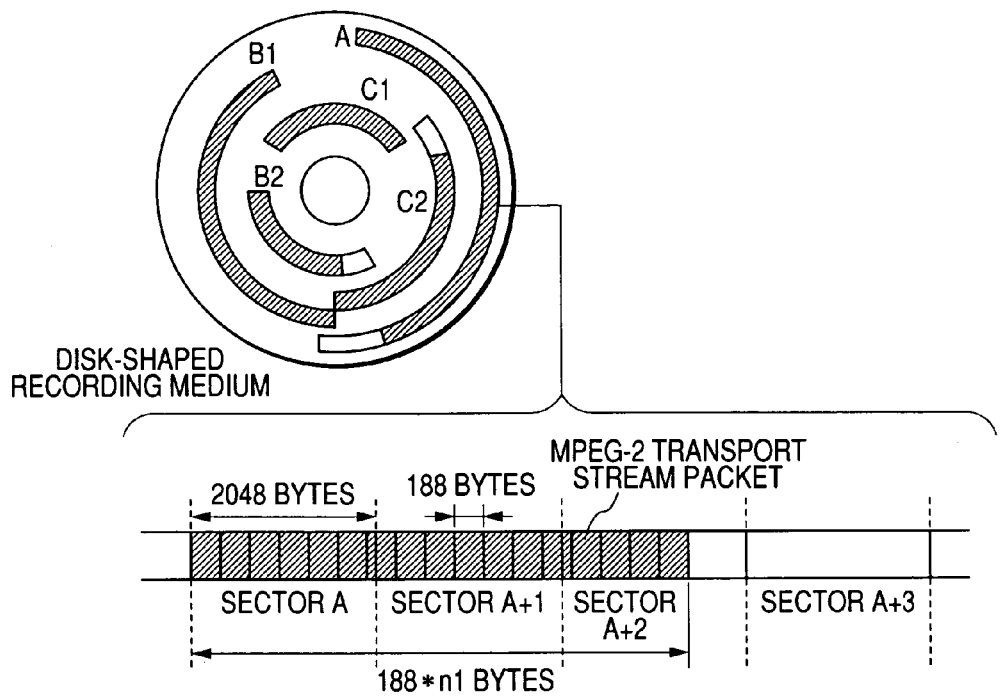

FIG. 3A
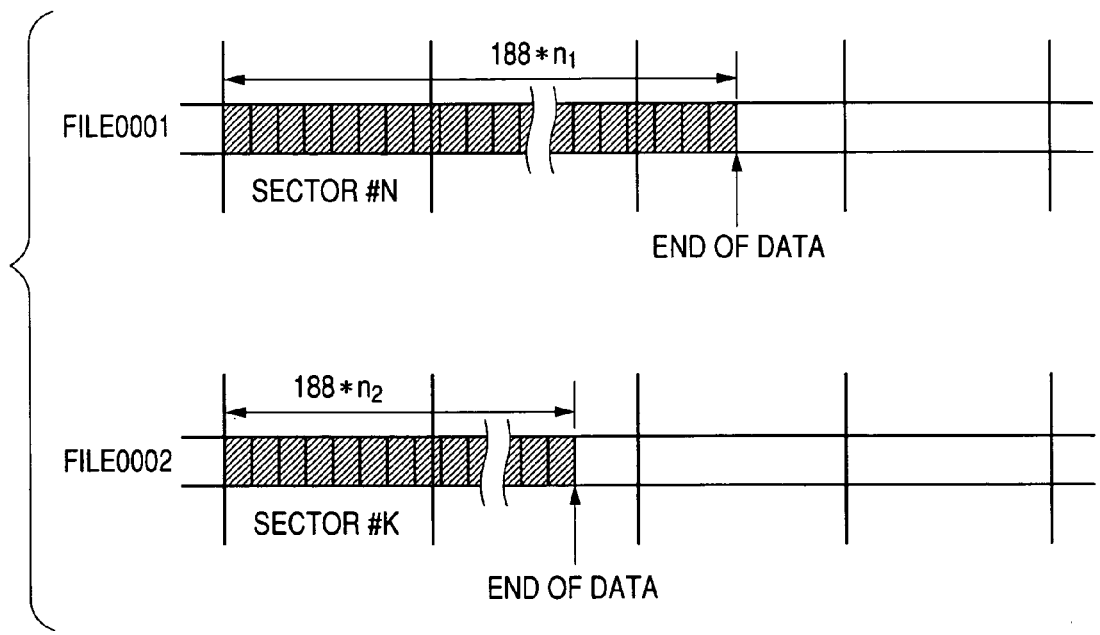
FIG. 3B
FILE SYSTEM INFORMATION PRIOR TO DIVISION PROCESSING
| FILE NAME | START SECTOR NUMBER | DATA SIZE |
|---|---|---|
| FILE0001 | #N | 188*n1 |
| FILE0002 | #K | 188*n2 |
FIG. 3C
$L = 2048 - ((188 * n1) \mod 2048)$
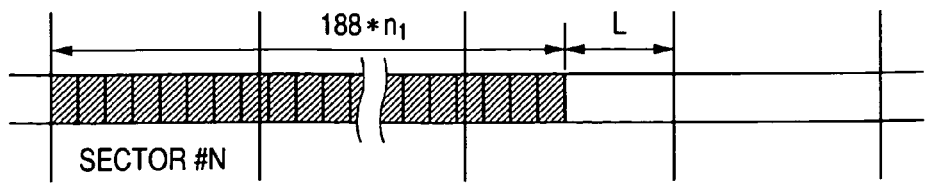

| FILE NAME | START SECTOR NUMBER | DATA SIZE |
|---|---|---|
| FILE0003 | #N | 188*n1+L |

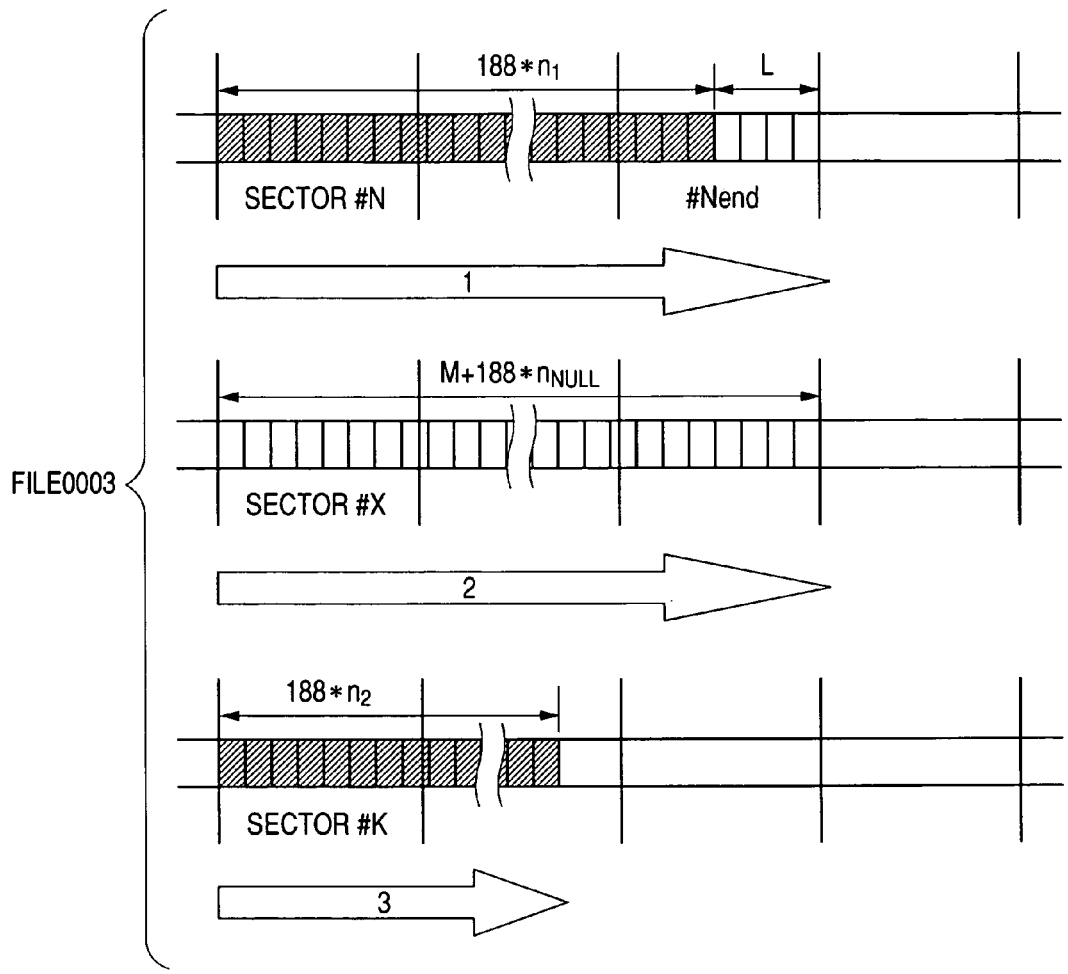

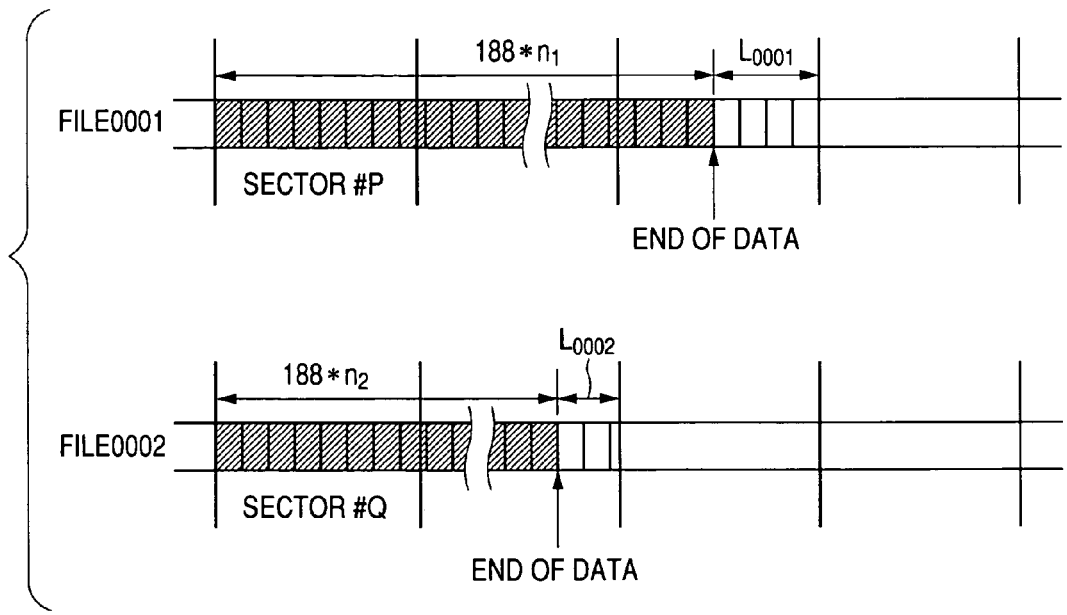

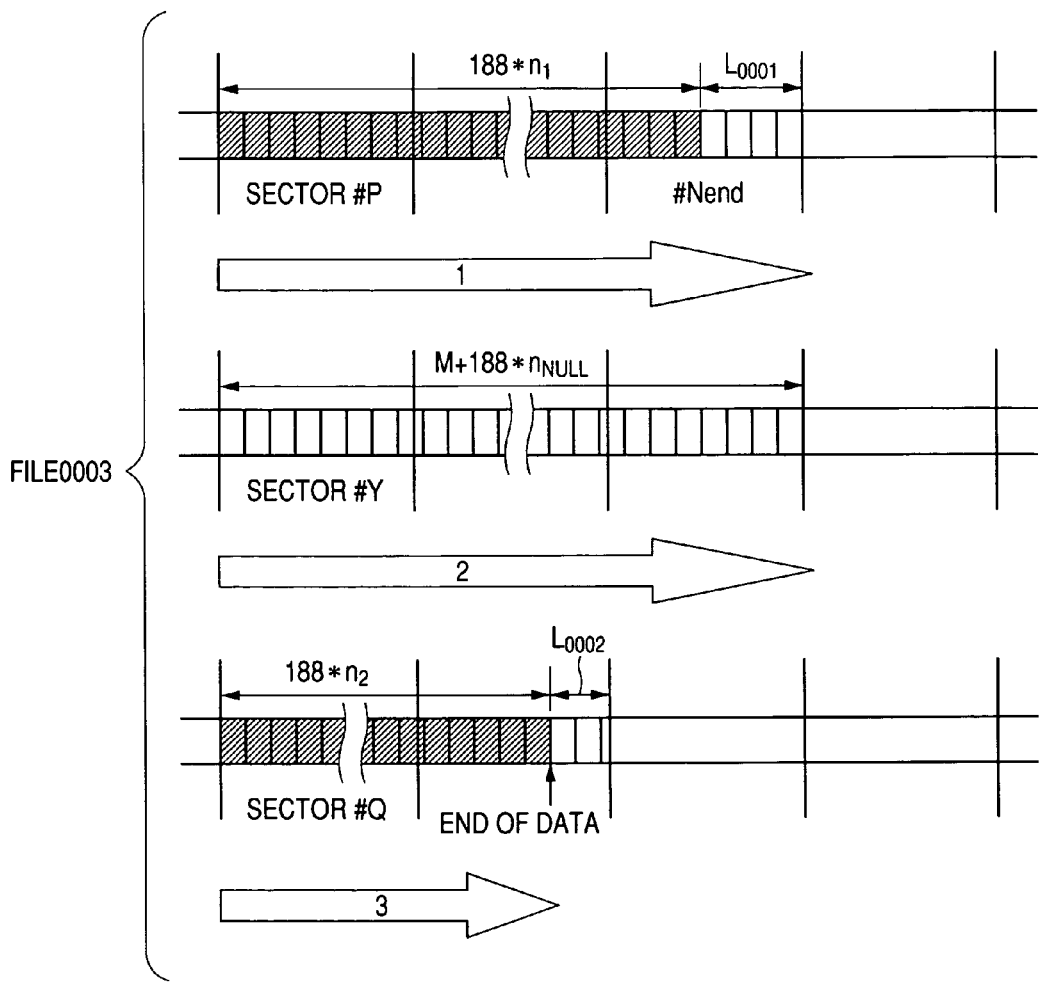

| FILE NAME | START SECTOR NUMBER | DATA SIZE | TIME AND DATE OF PRODUCTION |
|---|---|---|---|
| FILE A | A | 2048+X | yyyymmdd |
| FILE B | B1 | 2048*$n_B$ | yyyymmdd |
|  | B2 | Y | ... |
| ... | ... | ... | ... |

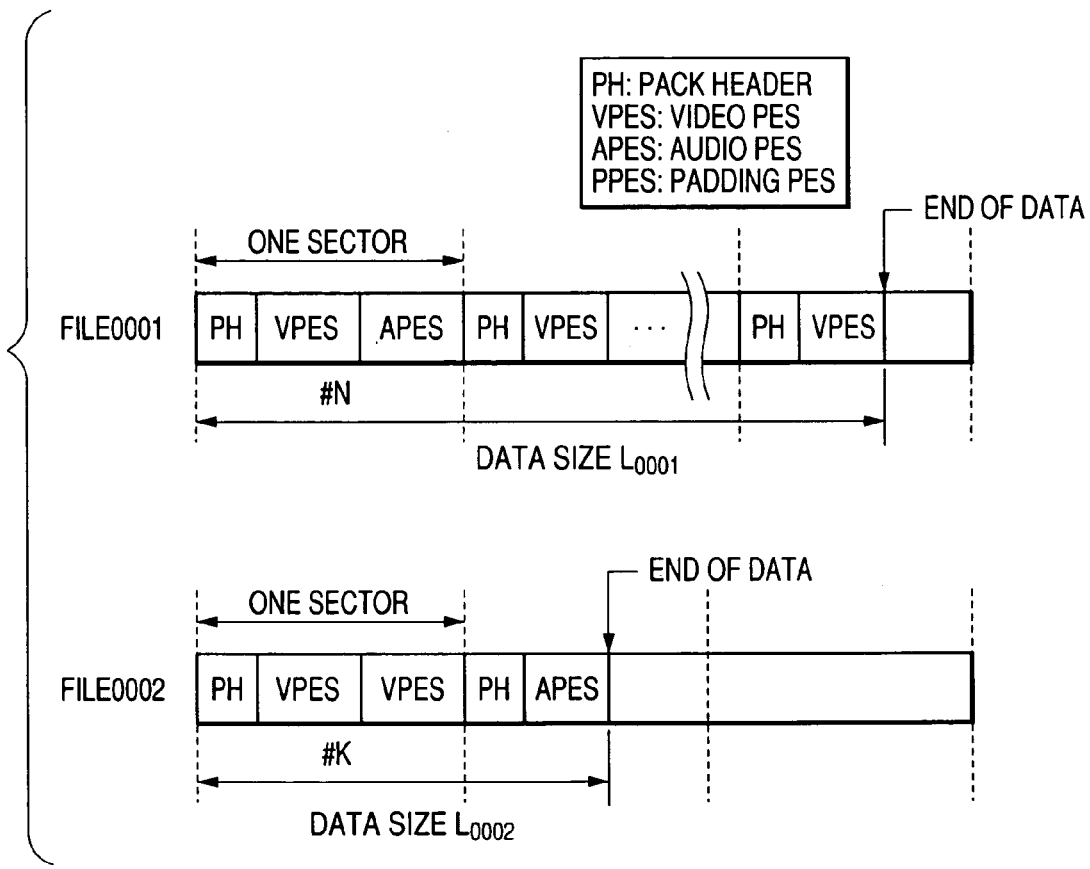

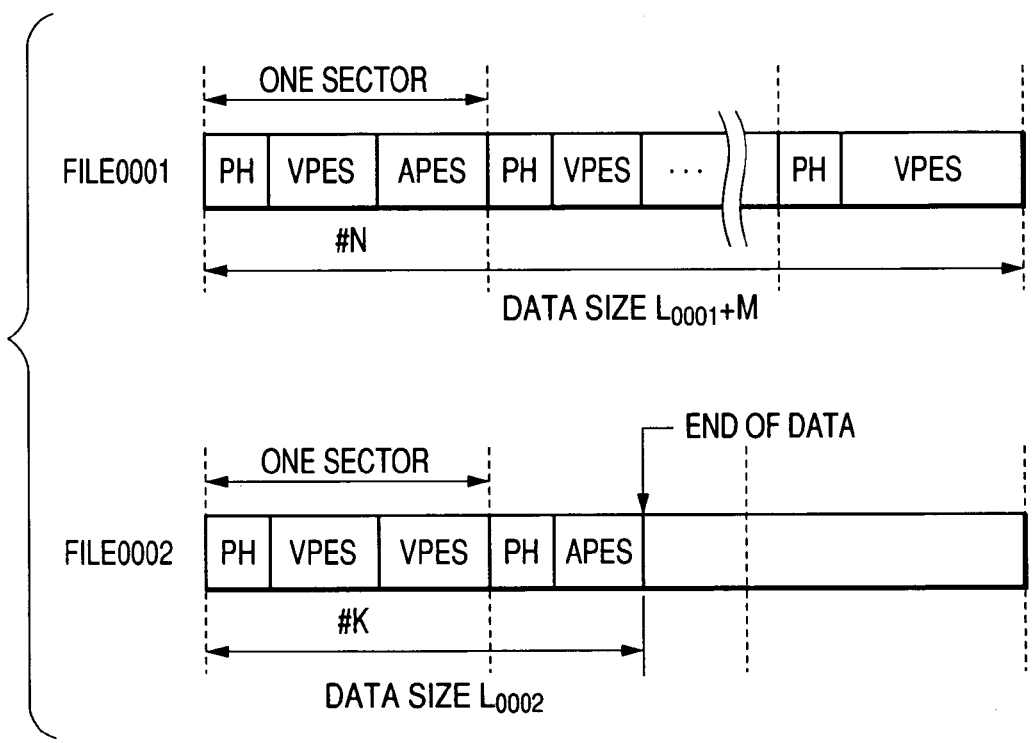

FIG. 28A
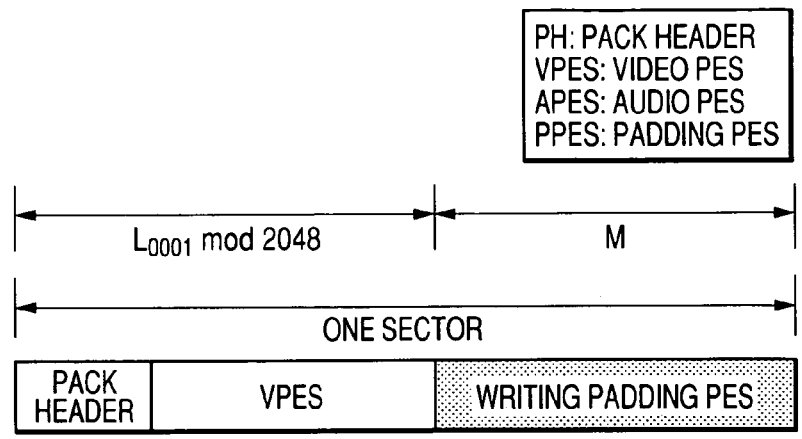
FIG. 28B
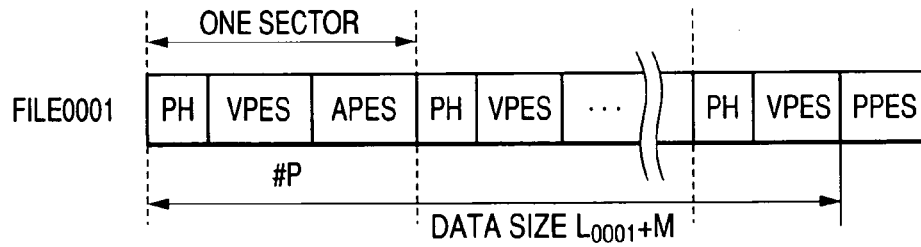
FIG. 28C
| FILE NAME | SECTOR NUMBER | DATA SIZE |
|---|---|---|
| FILE0001 | #P | $L_{0001}+M$ |

| FILE NAME | SECTOR NUMBER | DATA SIZE |
|---|---|---|
| FILE0001 | #Q | $L_{0001}$ |
| FILE0002 | #R | $L_{0002}$ |

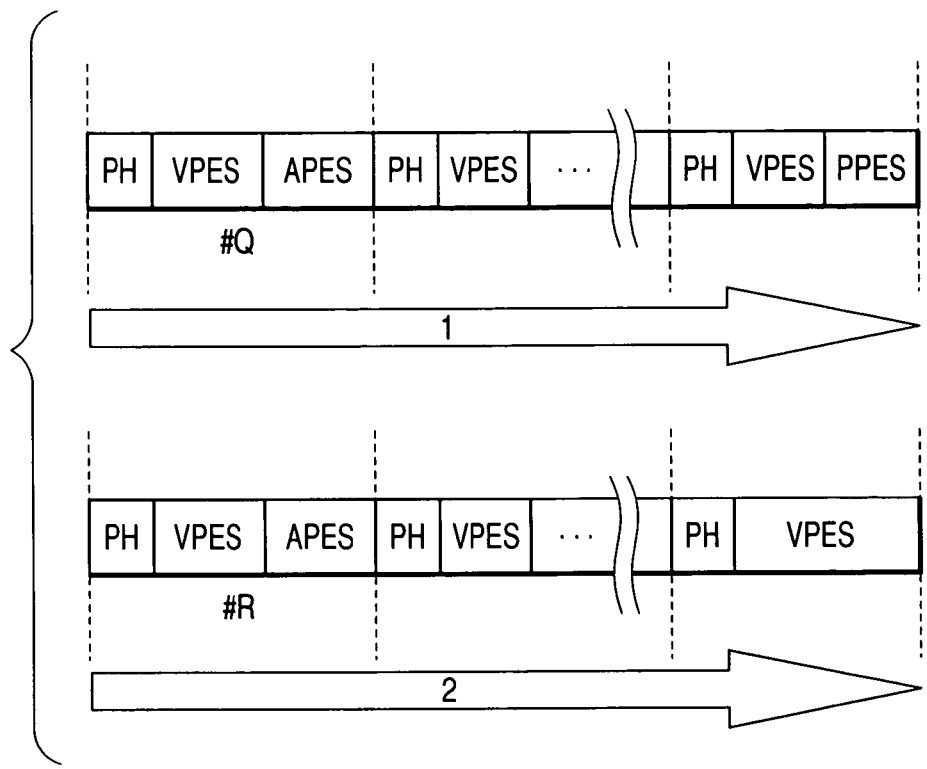

FIG. 31A
[STRUCTURE OF PS STREAM]
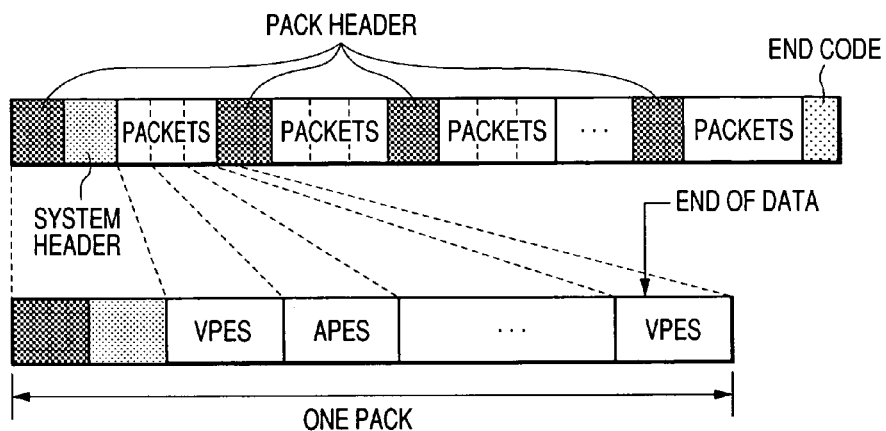
FIG. 31B
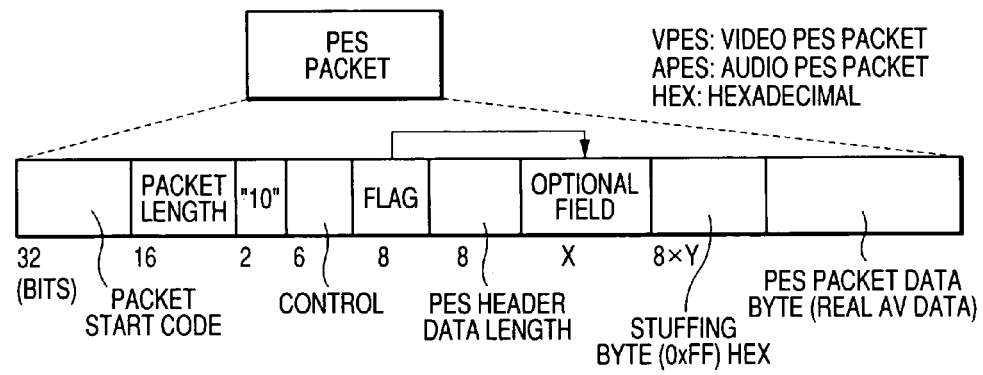
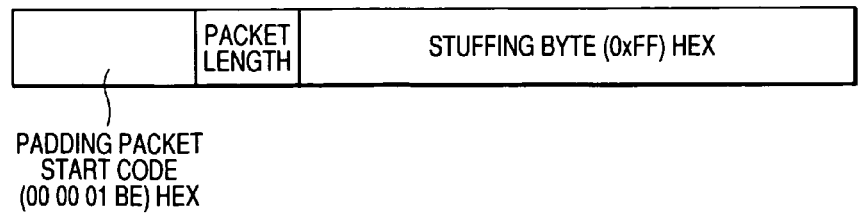

VIDEO STREAM DATA RECORDING APPARATUS

BACKGROUND OF THE INVENTION

1. Field of the Invention

The present invention relates to a recording apparatus which records and reproduces video stream data, which-is defined in MPEG (Moving Picture Experts Group) of a standard of a compressing encoding technology of a digital image and digital audio, onto and from a recording medium.

2. Related Background Art

Currently, satellite digital broadcasting and terrestrial digital broadcasting are becoming widespread in Japan. An MPEG2 transport stream (hereinafter referred to as MPEG2-TS) defined in IEC/ISO 13818 is a data format for transmitting image data and speech data which is mainly adopted in such a digital broadcasting field.

There is an apparatus which receives the transmitted MPEG2-TS and writes MPEG2-TS in, e.g. a disk-shaped recording medium to store MPEG2-TS as a data file while MPEG2-TS is still in the form of a digital signal in which an information quantity is compressed. For example, such the apparatus is disclosed in Japanese Patent Application Laid-Open No. 2000-268537. A user can repeatedly watch the recorded stream data as an AV program at any time by using the apparatus without substantially degrading picture quality and sound quality and further perform random access reproducing having high response.

The MPEG2-TS data format will be schematically described. A data structure of MPEG2-TS is shown in FIGS. 12 and 13. Although the detail MPEG2-TS standard is omitted because the detail MPEG2-TS standard is disclosed in various documents, schematically MPEG2-TS is a stream in which packets having a fixed length of 188 bytes, which is referred to as "TS packet," are arranged continuously. Like a structural drawing of the TS packet shown in FIG. 12, the TS packet includes a header having the fixed length and an adaptation field and/or a payload portion. As shown in FIG. 13, PES (Packetize Elementary Stream) is arranged while divided into one or a plurality of payload portions of the TS packet. It is assumed that MPEG2-TS is used in application fields such as the broadcasting and communication in which transmission line error is easy to occur. Therefore, in the TS packet, the packet length is set to the fixed length, which packet is easy to handle and whose recovery from the error can be made fast. Up to this point, MPEG2-TS is described.

On the other hand, among the apparatuses using an optical disk such as DVD (Digital Versatile Disc) as the recording medium, some apparatuses performs the recording with MPEG2 program stream (hereinafter referred to as MPEG2-PS) unlike the above MPEG2-TS. A recording and reproducing apparatus which records data in the rewritable optical disk such as DVD-RAM with the MPEG2-PS format is also disclosed. For example, such the apparatus is disclosed in Japanese Patent Application Laid-Open No. 2000-138896.

The MPEG2-TS data format will be schematically described. Although the detail MPEG2-PS standard is omitted because the detail MPEG2-PS standard is disclosed in various documents, schematically MPEG2-PS has a unit of a variable length block referred to as "pack" and MPEG2-PS is the stream in which the packs are arranged continuously. The pack includes a pack header and a plurality of PESs. The PES data included in one pack is formed by gathering pieces of information reproduced by respective constituents within the substantially same time.

In the case where the user performs edit processing on the MPEG2 data file recorded on the disk-shaped recording medium such as the optical disk, the processing such as combining of the files is very troublesome.

For example, in the case of MPEG2-TS, it is necessary to perform alignment adjustment to both a TS packet boundary of 188 bytes which is a data unit of MPEG2-TS and a sector boundary for recognizing the file subjected to the edit processing, on the file system with the data structure satisfying the TS packet boundary and the sector boundary. In the case of MPEG2-PS, it is necessary to perform alignment adjustment to both a pack boundary which is the data unit of MPEG2-PS and sector boundary for recognizing the file subjected to the edit processing, on the file system with the data structure satisfying the pack boundary and the sector boundary.

However, in order to perform the above adjustment, there are following problems. Namely, it is necessary that the file system managing the information on an address or a size of the data recorded in the optical disk is largely updated through many stages of the processing step, load on CPU (Central Processing Unit) controlling the whole processing of the edit device is therefore increased, and thus it takes a long time to perform the processing.

SUMMARY OF THE INVENTION

An object of the present invention is to solve the above-described problems.

Another object of the invention is to provide a video stream data recording apparatus which can cause a boundary of MPEG data to correspond to a sector boundary of the disk only by registering file system information managing position and size of data on the disk recognize without complicated disk access operation, and thereby can recognize the boundary of MPEG data and the sector boundary by the file system.

In order to attain the objects, according to an aspect of the present invention, the recording apparatus of the invention is an apparatus for recording image data, which comprises a recording unit which records recording data concerning the image data encoded by a predetermined encoding method on a recording medium, and a recording control unit which effects control so that in case that an end of the recording data to be recorded by the recording unit does not correspond to a boundary specified by the recording medium, the recording unit records the. recording data by adding thereto predetermined additional data for causing the end of the recording data to correspond to the predetermined boundary.

Further, according to another aspect of the invention, a recording apparatus of the present invention, for recording image data, comprises a recording unit which records recording data concerning a transport stream encoded by an MPEG encoding method on a disk-shaped recording medium; and a recording control unit which effects control so that in case that an end of the recording data to be recorded by the recording unit does not correspond to a sector boundary specified by the disk-shaped recording medium, the recording unit records dummy data for causing the end of the recording data to correspond to the sector boundary.

Further, according to still another aspect of the invention, a recording apparatus of the present invention, for recording image data, comprises a recording unit which records recording data concerning a program stream encoded by an MPEG encoding method on a disk-shaped recording medium; and a recording control unit which effects control so that in the case where an end of the recording data to be recorded by the recording unit does not correspond to a sector boundary specified by the disk-shaped recording medium, the recording unit records the recording data by adding dummy data into a PES packet in the program stream or by adding a dummy PES packet.

Still other objects of the present invention, and the advantages thereof, will become fully apparent from the following detailed description of the embodiments.

BRIEF DESCRIPTION OF THE DRAWINGS

FIG. 1A schematically shows a structure of MPEG2-TS data recorded on a disk in a first embodiment, and FIG. 1B shows file system information concerning a file recorded in the first embodiment;

FIG. 2A schematically shows a recording configuration and the data structure of the MPEG2-TS data recorded on the disk, and FIG. 2B shows file information of each file shown in FIG. 2A;

FIG. 3A is a view for explaining processing of combining the MPEG2-TS data recorded on the disk, FIG. 3B shows the file system information of each file shown in FIG. 3A, and FIG. 3C is a view for explaining the processing of combining the MPEG2-TS data recorded on the disk;

FIG. 7A is a view for explaining the processing of combining the MPEG2-TS data recorded on the disk, and FIG. 7B shows the updated file system information;

FIG. 9A is a view for explaining the processing of combining the MPEG2-TS data recorded on the disk in the first embodiment, and FIG. 9B shows the file system information of each file shown in FIG. 9A;

FIG. 10B is a view for explaining the processing of combining the MPEG2-TS data recorded on the disk in the first embodiment, FIG. 10C shows the file system information of each file shown in FIG. 10B.

FIG. 17A is a view for explaining the processing of combining the MPEG2-PS data recorded on the disk, and FIG. 17B shows the file system information of each file shown in FIG. 17A;

FIG. 23A is a view for explaining the processing of combining the MPEG2-PS data recorded on the disk, and FIG. 23B shows the updated file system information;

FIG. 28A is a view for explaining the recording steps of the MPEG2-PS data in the second embodiment, FIG. 28B is a view for explaining the recording steps of the MPEG2-PS data in the second embodiment, and FIG. 28C shows the updated file system information;

FIG. 30A is a view for explaining the processing of combining the MPEG2-PS data recorded on the disk in the second embodiment, and FIG. 30B shows the updated file system information; and FIG. 31A is a view for explaining the structure of the MPEG2-PS stream in the second embodiment, and FIG. 31B is a view for explaining the structures of a PES stream and a padding stream PES stream of MPEG2 in the second embodiment.

DETAILED DESCRIPTION OF THE PREFERRED EMBODIMENTS

The preferred embodiments of the invention will be described in detail hereinafter with reference to the accompanying drawings.

First Embodiment

Figure 8:
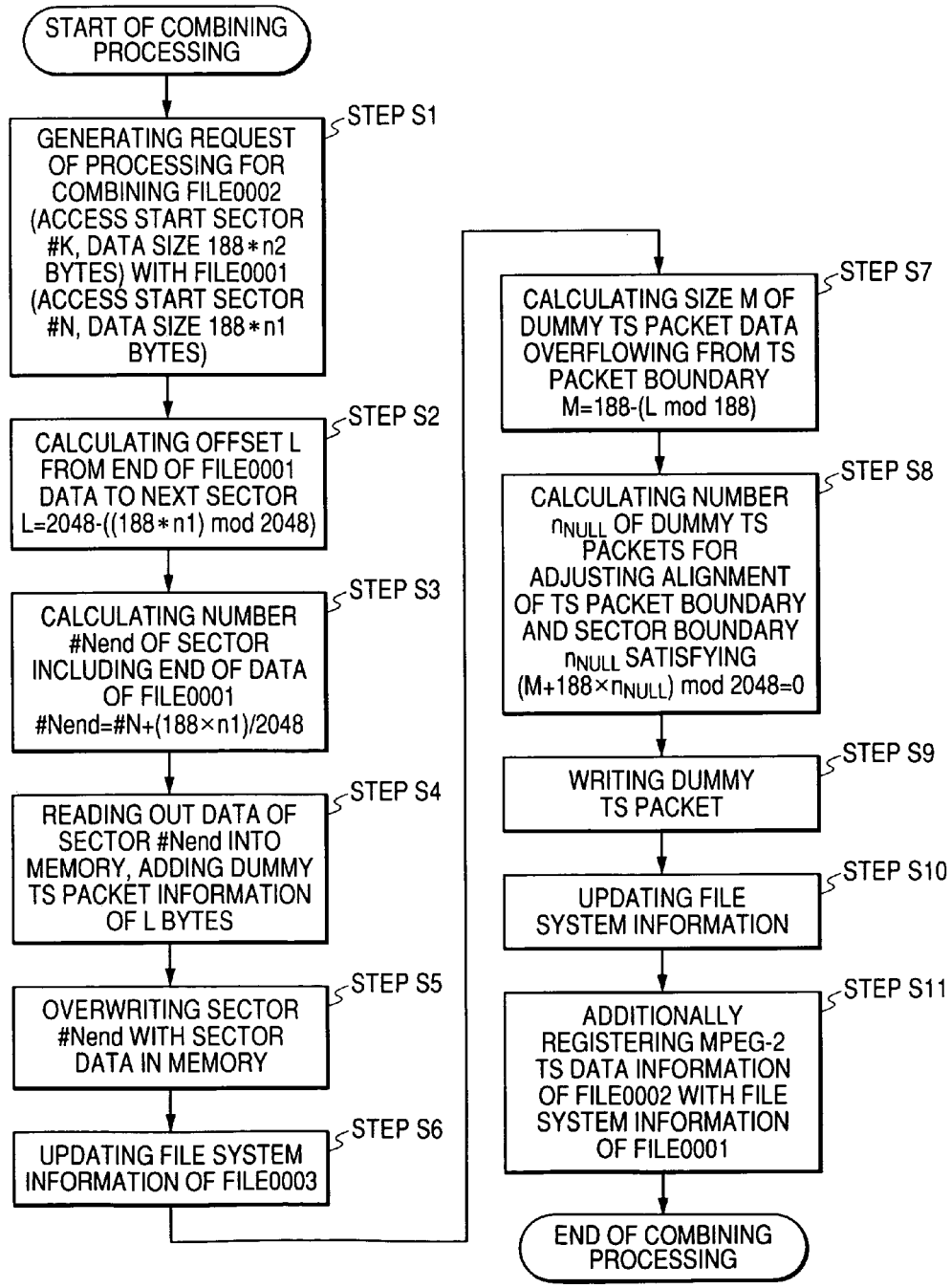
FIG. 8 is a flow chart for explaining the processing of combining the MPEG2-TS data recorded on the disk.
Figure 14:
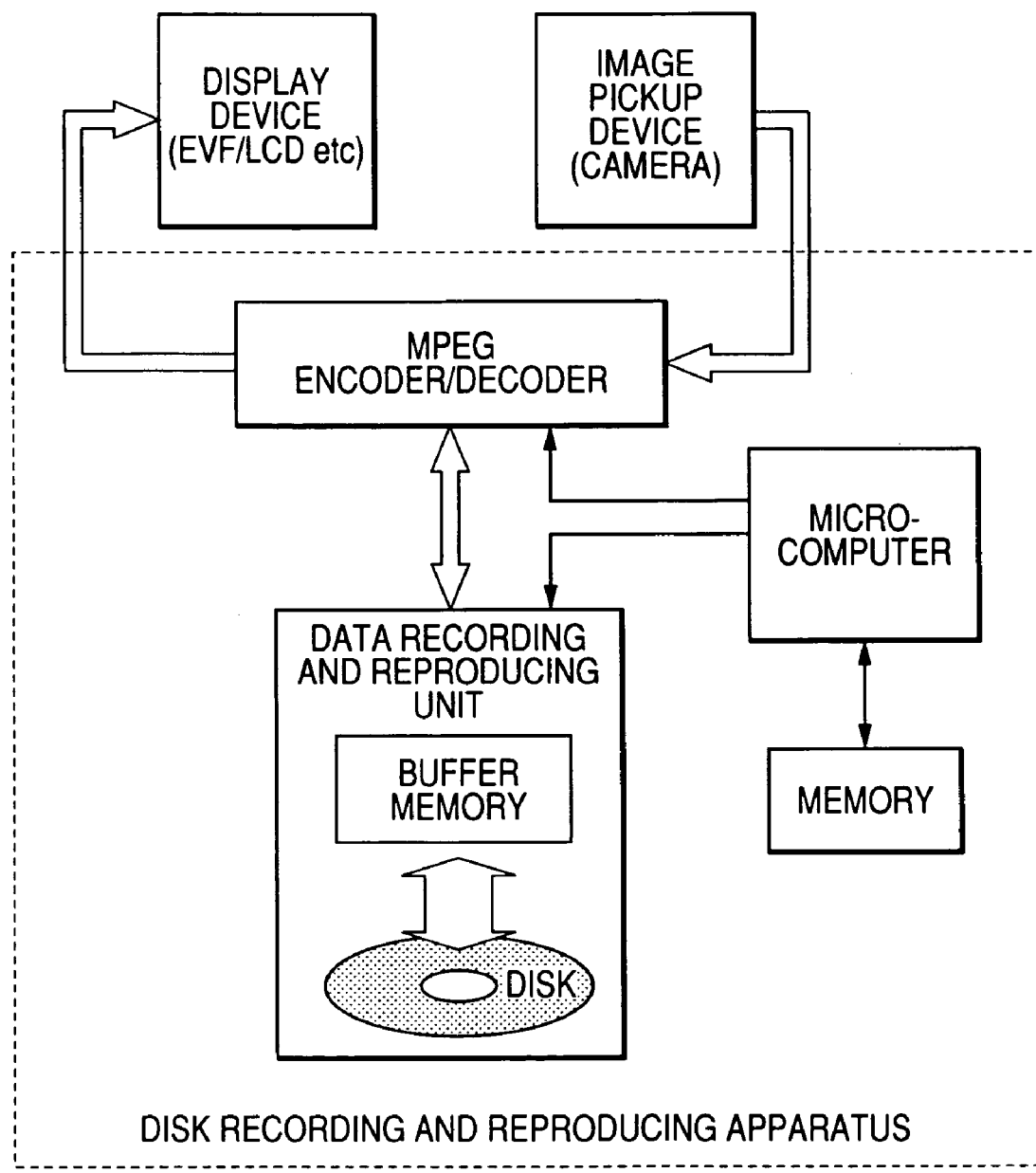
FIG. 14 is a block diagram of a disk recording and reproducing system.

FIG. 2A schematically shows the recording configuration and the data structure of the MPEG2-TS data recorded on the disk-shaped recording medium (hereinafter referred to as optical disk or disk), and FIG. 2B shows the file information of each file shown in FIG. 2A. FIGS. 3A, 3B and 3C to 7A and 7B show an example in the case of the processing of combining (editing) the MPEG2-TS data, and FIG. 8 is a flow chart showing a stream of the combining processing. FIG. 14 is a block diagram of the disk recording and reproducing system in the embodiment. The disk recording-and reproducing system includes a disk recording and reproducing apparatus which is arranged to input image and speech signals from an image pickup device (camera) and output the image and speech signals to a monitor such as a display device (electronic view finder (EVF)/liquid crystal display (LCD)). The disk recording and reproducing apparatus includes an MPEG encoder/decoder (codec), a data recording and reproducing unit having a buffer memory and the detachable optical disk or the built-in hard disk which is of the recording medium, a microcomputer, and a memory.

Like an example shown in FIGS. 2A and 2B, when the MPEG2-TS data is written on the disk, the MPEG2-TS data is recorded while continuously arranged in each logical block referred to as sector, or the MPEG2-TS data is recorded while discretely arranged on the disk in the case where the continuous unrecorded sector area is not enough. In the embodiment, it is defined that the size of one sector has 2048 bytes.

In the randomly-accessible disk-shaped recording medium such as the hard disk and the optical disk, the file system such as FAT (File Allocation Table) or UDF (Universal Disk Format) is required in order to manage the recorded data file. The file system is specified as follows:

1. A position of data, from which recording is started-must be always a front end of the sector.

2. The data must not be interrupted in the middle of the sector except the sector in which an end of the data file exists.

3. The sector area must not have the different data files.

Therefore, the recording and edit processing of MPEG2-TS must conform to the above specifications.

A table of the file system information shown in FIG. 3B is provided as the method for managing the MPEG2-TS data recorded on the disk as the file and for constructing the user interface for simply performing the subsequent edit processing. In the table of FIG. 3B, a file name (user can arbitrary specify) of the MPEG2-TS data to be subjected, a start sector number (position information) indicating from where the data file is actually recorded, and the size of the data started from the start sector number are shown for the recording data illustrated in FIG. 3A, and each information is managed in connection with one another. This method allows the user to access the desired file only by specifying the file name while the user is not aware of which data is located at which position on the disk.

After the MPEG2-TS data is recorded on the disk in a manner shown in FIGS. 2A and 2B, the processing of combining the data is performed on the disk recording and reproducing apparatus of FIG. 14 having the plurality of MPEG2-TS data and the file system information in connection with the MPEG2-TS data. The data combining method will be described referring to FIGS. 3A, 3B and 3C to 7A and 7B and a flow chart of FIG. 8 in which a procedure of the combining processing is shown.

As shown in FIGS. 3A and 3B, there are two MPEG2-TS data files FILE0001 (access start sector No. N and data size of 188×n1 bytes) and FILE0002 (access start sector Number K and data size of 188×n2 bytes) on the disk. When a request of combining FILE0001 with FILE0002 to make the data file FILE0003 is generated by user's command (Step S1 of FIG. 8), as shown in FIG. 3C, the microcomputer on the disk recording and reproducing apparatus calculates an offset value L from the end of the data file FILE0001 on the disk, i.e. from the 188×n1-th byte from the access start sector No. N to the next sector by the following equation (1) (Step S2 of FIG. 8).

$$L=2048-((188 \times n1) \bmod 2048) \quad (1)$$

Figure 4A:
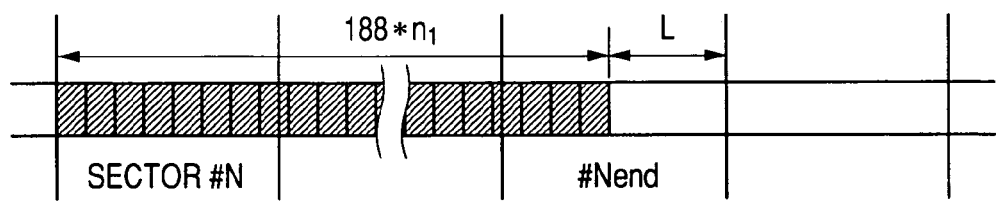
FIG. 4A is a view for explaining the processing of combining the MPEG2-TS data recorded on the disk.

As shown FIG. 4A, the microcomputer calculates the sector number #Nend in which the end of the data of FILE0001 exists, from the following equation (2) (Step S3 of FIG. 8).

$$\#Nend=\#N+(188 \times n1)/2048 \quad (2)$$

Figure 4B:
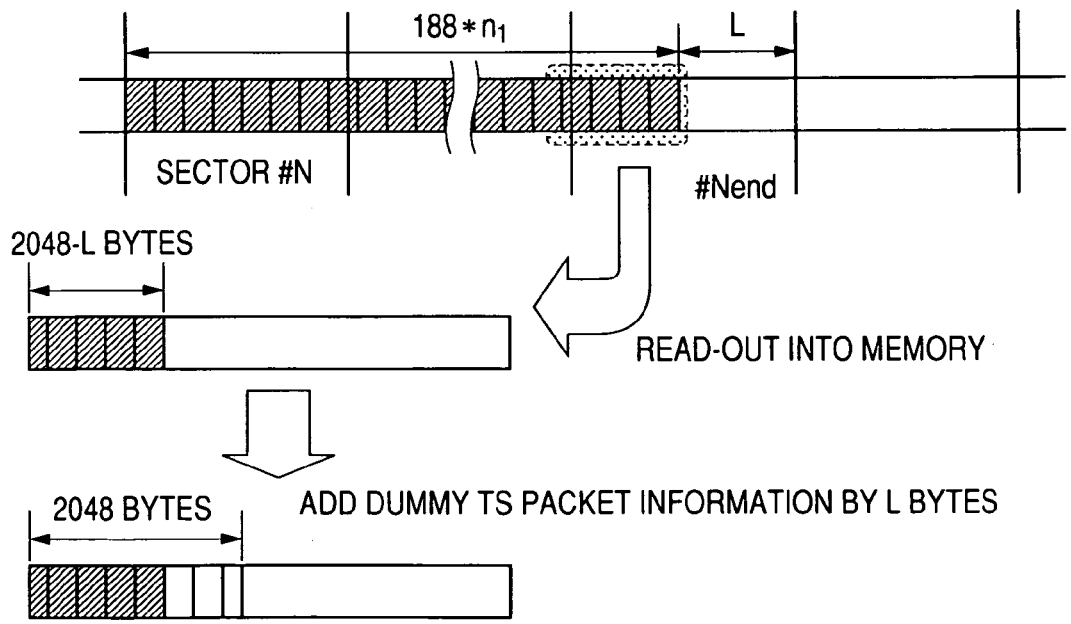
FIG. 4B is a view for explaining the processing of combining the MPEG2-TS data recorded on the disk.

As shown FIG. 4B, the microcomputer reads the sector data having (2048-L) bytes of the sector number #Nend determined by the equation (2) into the memory such as RAM and performs adding processing of dummy TS packet data information of L bytes from the position of the end of the sector data read in (Step S4 of FIG. 8).

Figures 5A, 5B:
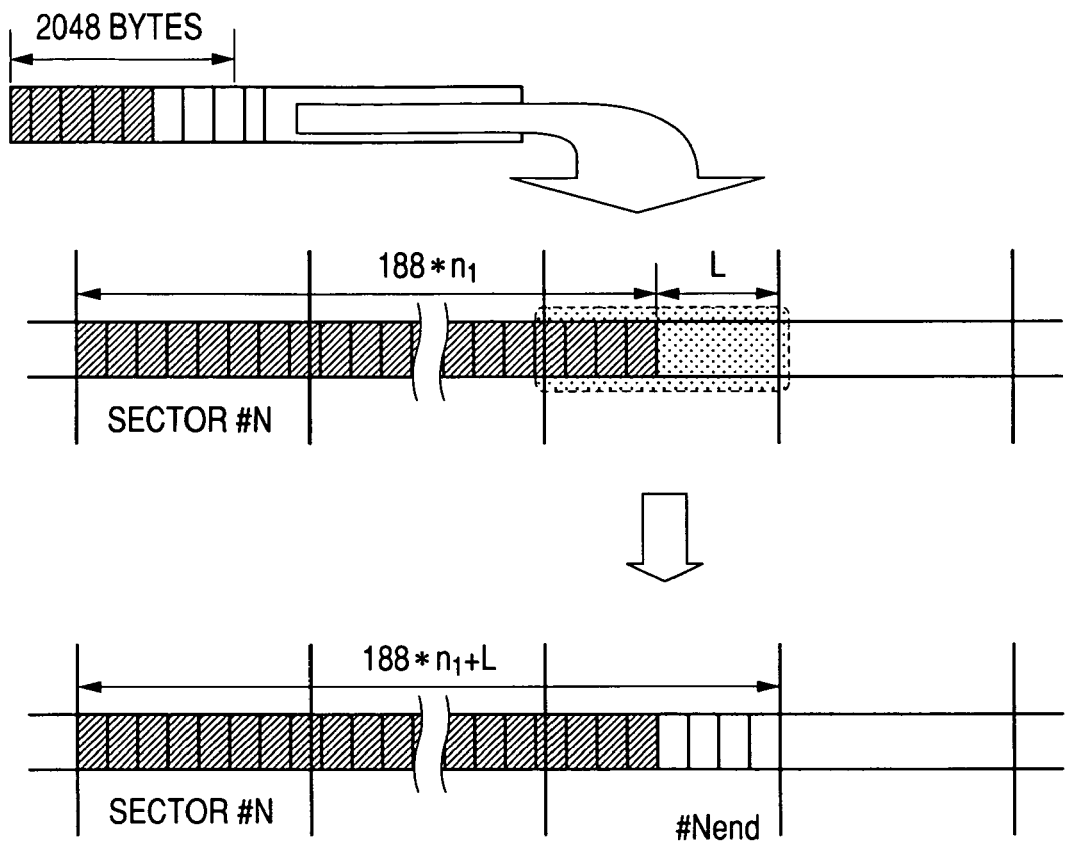
FIG. 5A is a view for explaining the processing of combining the MPEG2-TS data recorded on the disk.
FIG. 5B shows the updated file system information.

As shown FIG. 5A, the microcomputer reads out the sector data (2048 bytes) to which the dummy TS packet information has been added from the buffer memory and overwrites the sector #Nend on the disk with the sector data (Step S5 of FIG. 8).

As shown FIG. 5B, the microcomputer adds and updates the information of the file FILE0003generated after the combining processing as the file system having the access start sector number #N and the access size of 188×n1+1 bytes (Step S6 of FIG. 8). It will be appreciated that the information of the file FILE0003 may be updated on the memory or written onto the disk.

The microcomputer calculates by the following equation (3) the data size M overflowing from the TS packet unit of 188 bytes in case of adding the dummy TS packet data of L bytes in Step S4 (Step S7 of FIG. 8).

$$M=188-(L \bmod 188) \quad (3)$$

The microcomputer calculates the number $n_{NULL}$ of the dummy TS packets which are required to be added for alignment adjustment of the sector boundary and the packet boundary, on the basis of the data size M by the following equation (4) (Step S8 of FIG. 8).

$$n_{NULL} \text{ satisfying } (M+188 \times n_{NULL}) \bmod 2048 = 0 \quad (4)$$

Figures 6A, 6B:
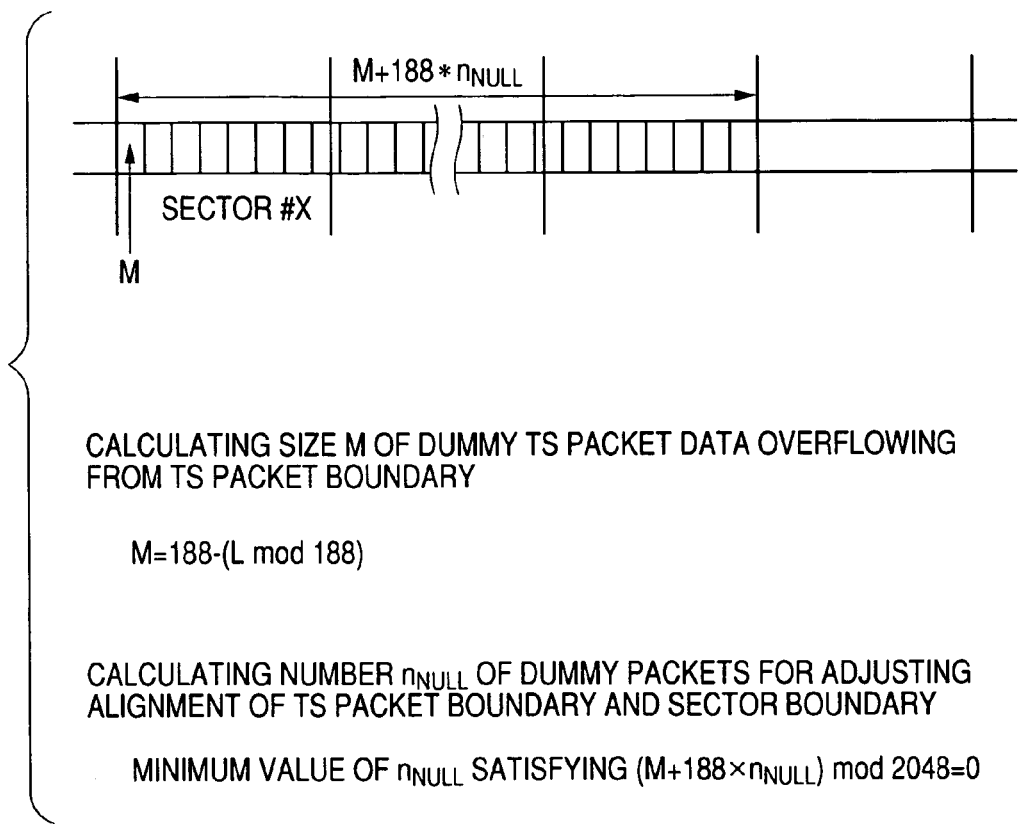
FIG. 6A is a view for explaining the processing of combining the MPEG2-TS data recorded on the disk.
FIG. 6B shows the updated file system information.

After the microcomputer searches the unrecorded sector area (start sector number #X) on the disk, as shown in FIG. 6A, the microcomputer writes the data size M overflowing from the TS packet boundary, which is calculated by the equation (3), and the dummy TS packet of $n_{NULL}$ calculated by the equation (4) (Step S9 of FIG. 8). Then, the microcomputer adds and updates the information of the file FILE0003 on the file system as the file system having the access start sector number #X and the access size of 188×$n_{NULL}$+M bytes (Step S10 of FIG. 8).

As shown in FIGS. 7A and 7B, the microcomputer additionally resisters the file system information (access start sector Number #K and data size of 188×n2 bytes) of FILE0002 which is of the original file of the combining processing to the file system information of FILE0003 (Step S11 of FIG. 8) and ends the combining processing. The combining processing allows FILE0003 to be recognized as the file which integrates the data of the 188×n1+L bytes from the sector number #N, the data of 188×$n_{NULL}$+M bytes from the sector number #X, and the data of 188×n2 bytes from the sector number #K.

The MPEG2-TS data combining method different from the above-described embodiment will be described below. The configuration in which AV data is registered as the new data file by recording the AV data on the disk will be described, and then the configuration which combines the two data files to edit then as one new data file, using the recorded data file will be described.

On the disk recording and reproducing apparatus of FIG. 14, in the case where the end of the AV data packet does not correspond to the sector boundary in the recording the MPEG2-TS data (AV data) which is generated by compressing coding an AV signal such as the image and the speech with MPEG2 or the like, the microcomputer calculates the data size from the end of the AV data packet to the next sector boundary and certainly writes the dummy TS packet in the portion from the end of the AV data packet to the next sector boundary. The above recording configuration will be described referring to FIGS. 1A and 1B.

FIG. 1A schematically shows the structure of the data file including the AV data and NULL data which are recorded on the disk. FIG. 1B shows the file system information concerning the data file recorded in FIG. 1A. In FIG. 1A, the end of the AV data packet does not correspond to the sector boundary.

In this case, as shown in FIG. 1A, the NULL data packet (NULL packet) is recorded as the dummy TS packet between the end of the AV data packet and the next sector boundary. In the NULL packet, the decoding of the data is never performed even if the NULL packet is inputted to the decoding device of the MPEG2-TS data.

The recording operation for this case will be described referring to the example of the configuration of disk recording and reproducing apparatus shown in FIG. 14. For example, in the case where the effective AV data (MPEG2-TS data) having the data size of 188×n1 bytes shown in FIG. 1A is recorded on the disk, as shown in FIG. 14, the AV data which is coded and multiplexed by the MPEG encoder/decoder is inputted to the buffer memory before recording the AV data on the disk in the data reproducing and recording unit, the edit of the recording data is performed by using the buffer memory, and the Null packet following the AV data is added. The control is performed by the microcomputer, and a program and the like required for the control are stored in the memory.

The recording method will be described in detail below. The microcomputer determines the offset value L from the end of the effective AV data to the next sector by the following equation (5).

$$L=2048-((188 \times n1) \bmod 2048) \quad (5)$$

The microcomputer prepares the NULL packet of the MPEG2-TS of the data size L determined by the equation (5) and controls the recording so as to add the NULL packet from the end of the NULL packet by using the buffer memory after recording the effective AV data on the disk. As shown in FIG. 1B, the recorded file is set to FILE0001, FILE0001 includes the NULL packet to make the data file of 188×n1 bytes, and the data file is newly registered as the file system information. The NULL packet added to the sector boundary securely exists on the disk. However, in this case a string of data files including the NULL packet is made, and only the NULL packet portion is not therefore recognized on the file system at the stage of recording the new stream. At this point, it is not required that the offset value L is divisible by the packet size of 188 bytes of the MPEG2-TS data and the packet boundary correspond to the sector boundary.

According to the above configuration, when the end of the effective AV data packet does not correspond to the sector boundary, the recorded AV data can be dealt with as the manageable recording data even in the file system by padding the portion between the end of the effective AV data packet and the sector boundary.

Figure 10A:
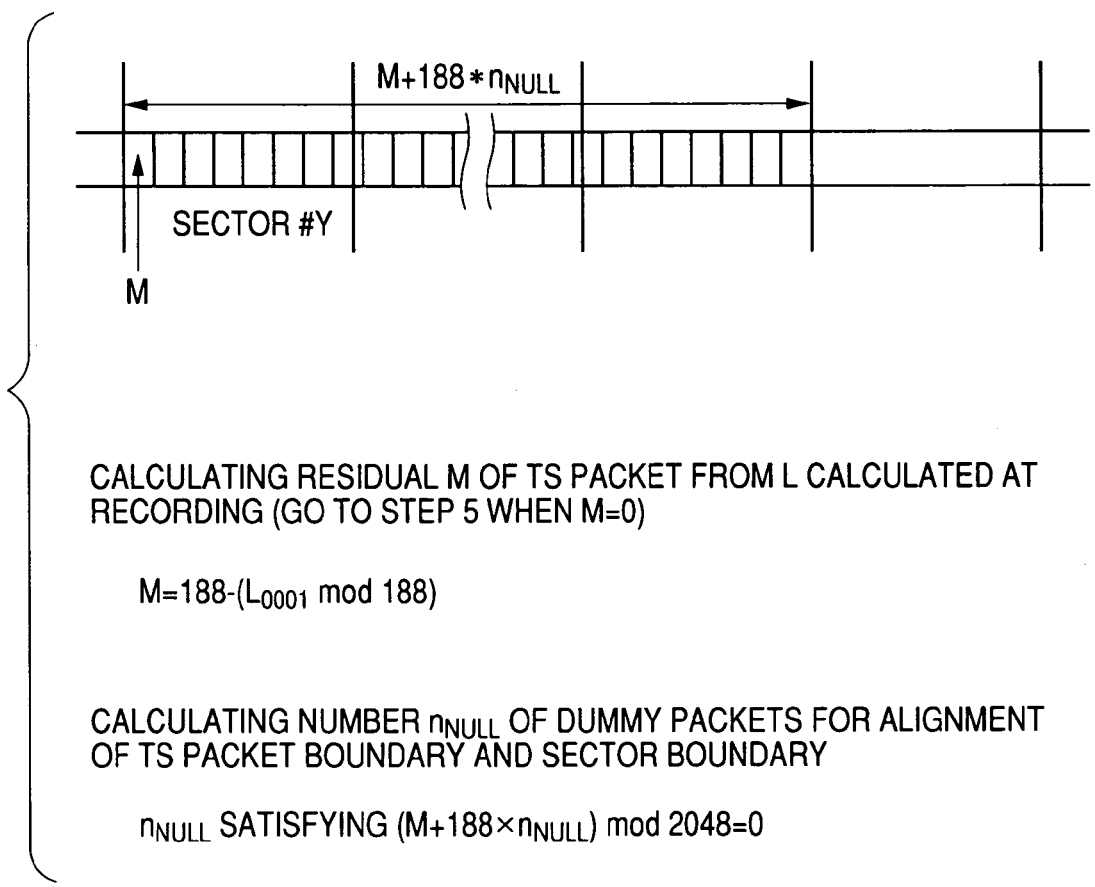
FIG. 10A is a view for explaining the processing of combining the MPEG2-TS data recorded on the disk in the first embodiment.
Figure 10D:
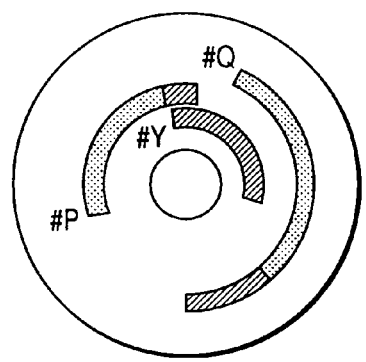
FIG. 10D shows the recording configuration on the disk of each file shown in FIG. 10B.
Figure 10E:
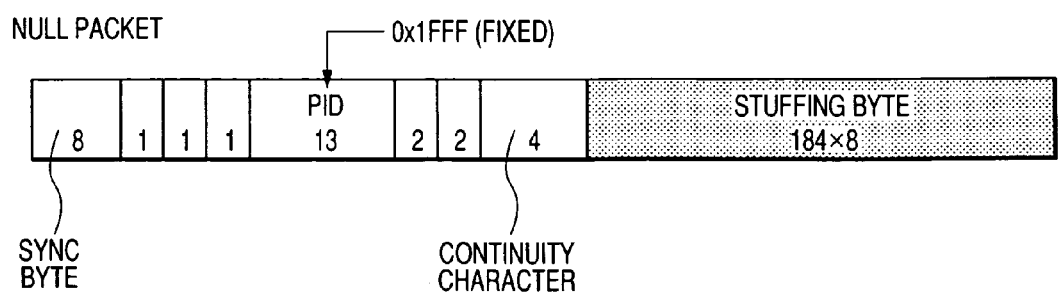
FIG. 10E is a view for explaining the structure of a NULL packet.
Figure 11:
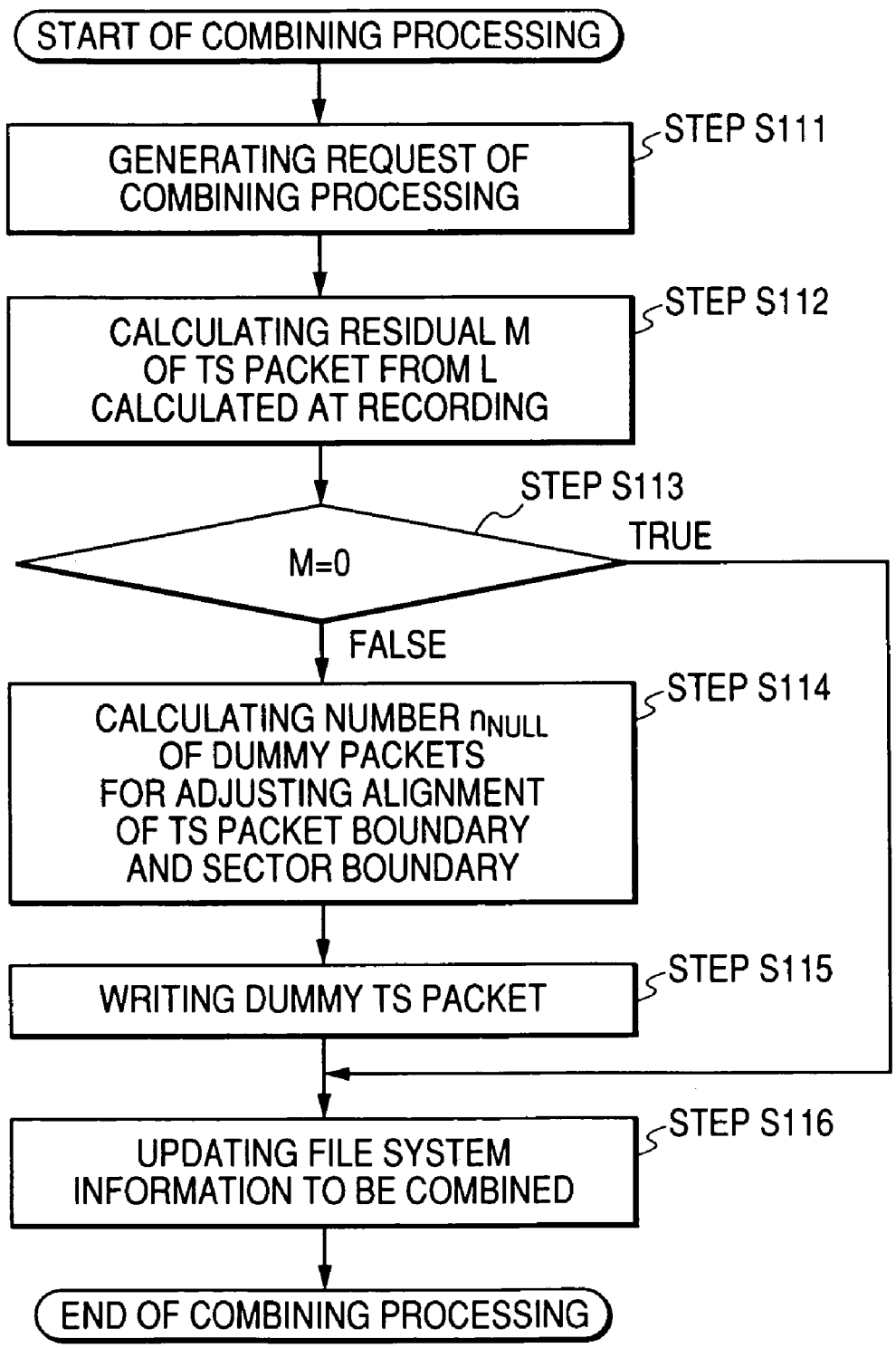
FIG. 11 is a flow chart for explaining the processing of combining the MPEG2-TS data recorded on the disk in the first embodiment.
Figure 12:
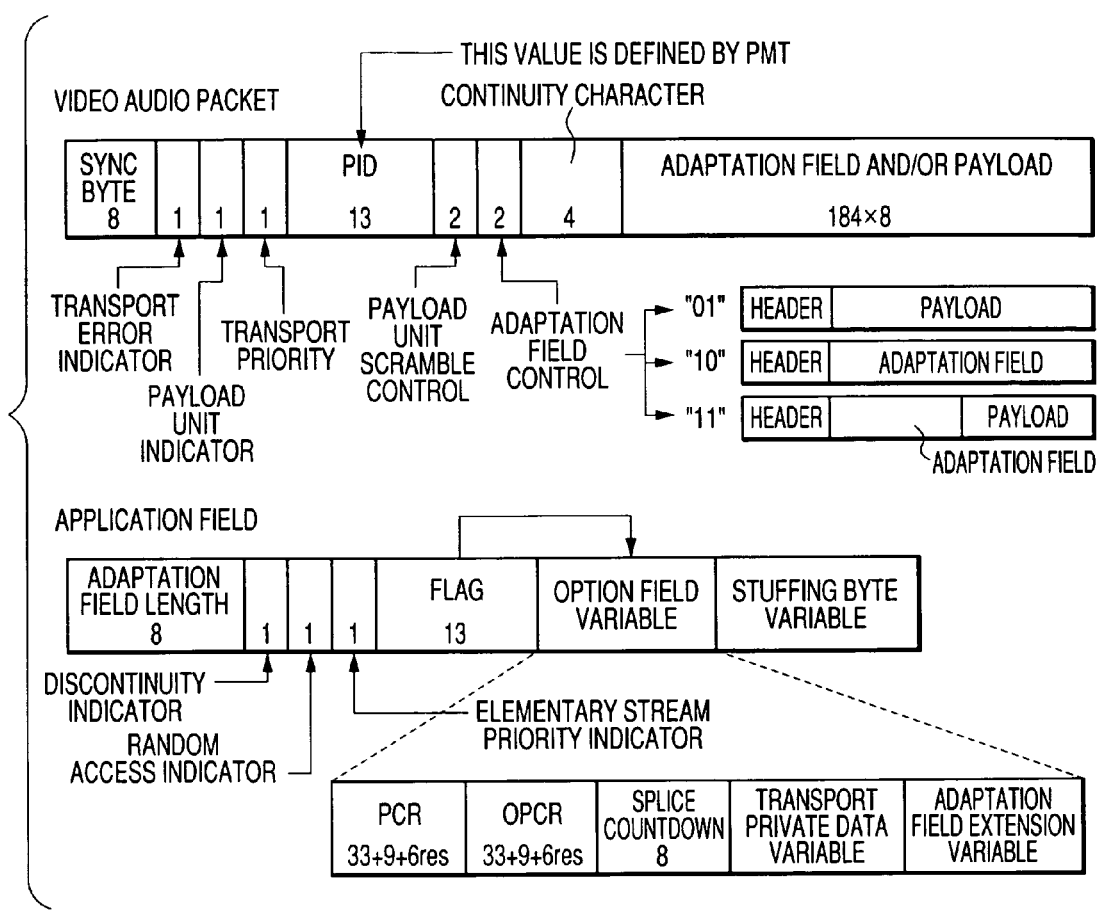
FIG. 12 schematically shows the structure of the packet in MPEG-TS.
Figure 13:
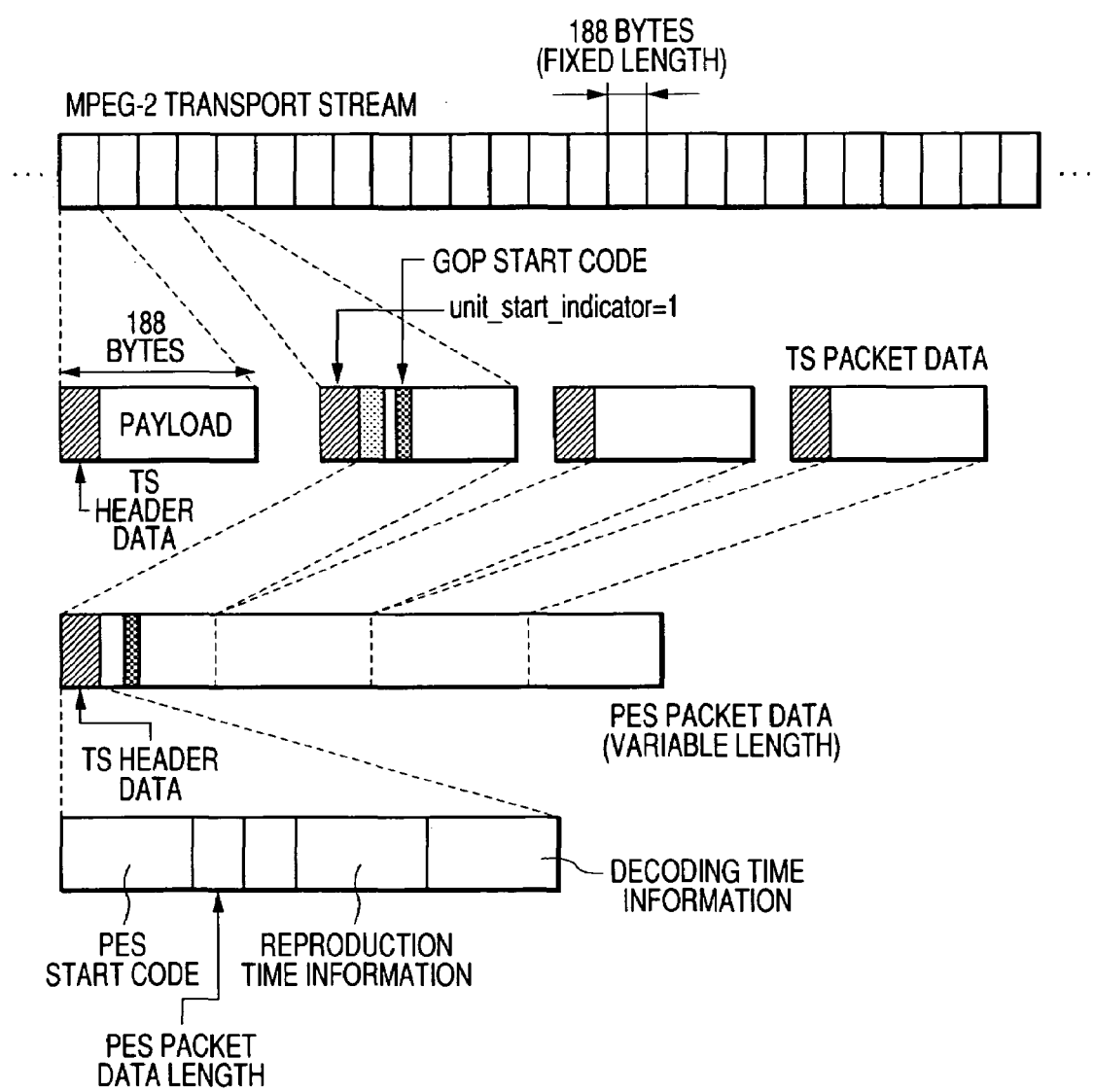
FIG. 13 schematically shows the structure of the stream in MPEG-TS.

The method of combining the AV data recorded on the disk in the above-described manner will be described below referring to FIGS. 9A and 9B to 11. The case in which the processing request for combining the two MPEG2-TS data files (FILE0001 and FILE0002) recorded on the disk to generate the new file FILE0003 is generated will be described referring to FIGS. 9A and 9B to 10A through 10E. FIG. 11 shows the combining processing in the form of the flow chart.

As shown in FIGS. 9A and 9B, there are two MPEG2-TS data files FILE0001 (access start sector Number P and data size of 188×n1 bytes) and FILE0002 (access start sector Number Q and data size of 188×n2 bytes) recorded on the disk. When the request for combining the two MPEG2-TS data files FILE0001 and FILE0002 to generate the file FILE0003 is generated by the user's command (Step S111 of FIG. 11), as shown in FIG. 10A, since the dummy TS packet for the edit is required between FILE0001 and FILE0002 in order to adjust the TS packet boundary and the sector boundary, the microcomputer generates the dummy TS packet. The NULL packet is recorded as the dummy TS packet. FIG. 10E shows an example of the structure of the NULL packet.

For the method of generating the NULL packet, the microcomputer calculates the excess value M of the TS packet from the offset value L0001 of FILE0001 calculated during the recording by the following equation (6) (Step S112 of FIG. 11).

$$M=188-(L0001 \bmod 188) \quad (6)$$

Then, the microcomputer decides whether M=0 or not (Step S113 of FIG. 11). In the case of M=0, the combining processing proceeds to Step S116. In the case of M≠0, the combining processing proceeds to Step S114.

In the case of M≠0, the microcomputer calculated the necessary number of dummy TS packets $n_{NULL}$ by the following equation (7) in order to adjust the TS packet boundary and the sector boundary (Step S114 of FIG. 11).

$$(M+(188 \times n_{NULL})) \bmod 2048 = 0 \ (n_{NULL} \text{ satisfies this equation}) \quad (7)$$

As shown in FIG. 10A, the microcomputer writes the dummy TS packet having $M+188 \times n_{NULL}$ bytes, i.e. the NULL packet in the area starting from the sector number Y (Step S115 of FIG. 11). Thus, the data recorded on the disk becomes the structure shown in FIG. 10B, and each piece of the data is recorded on the disk as shown in FIG. 10D.

Finally, for the data recorded as shown in FIG. 10B, the microcomputer updates the file system information as shown in FIG. 10C (Step S116 of FIG. 11). Namely, the microcomputer integrates three pieces of information as FILE0003 by embedding the information (access start sector Number Y and data size of $M+188 \times n_{NULL}$ bytes) in the already recorded dummy TS packet between the file information of FILE0001 (access start sector Number P and data size of 188×n1+L0001 bytes) and the file information (access start sector Number Q and data size of 188×n1 bytes) and registers FILE0003 in the file system to update the file system, and then the microcomputer finishes the combining processing. The plurality of MPEG2-TS data packets and the dummy TS packet which are combined by the above-described manner are managed as one file by the system file.

At this point, since the NULL packet data portion of L0001 bytes added in recording the data of FILE0001 already exists between the end of the data of FILE0001 and the sector boundary in accordance with the above-described structure, the file system information of FILE0003 generated after the combining processing may be registered as only one file including the data of the 188×n1+L0002 bytes from the sector number #P, the data of $188×n_{NULL}+M$ bytes from the sector number #Y, and 188×n2 bytes from the sector number #Q.

It will be appreciated that File0003 made by the combining processing may be registered in the file system as the original file FILE0001.

It is also possible that private data or the like which is formed so as not to decode the data when the data is inputted in the decoder of the MPEG2-TS data is substituted for the NULL packet.

The number of combined pieces of the AV data is not limited to the two pieces, and the combining processing can be performed to three or more AV data.

Second Embodiment

The MPEG2-TS data was described in the first embodiment of the invention, and the MPEG2-PS data will be described in a second embodiment of the invention.

Figures 16A, 16B:
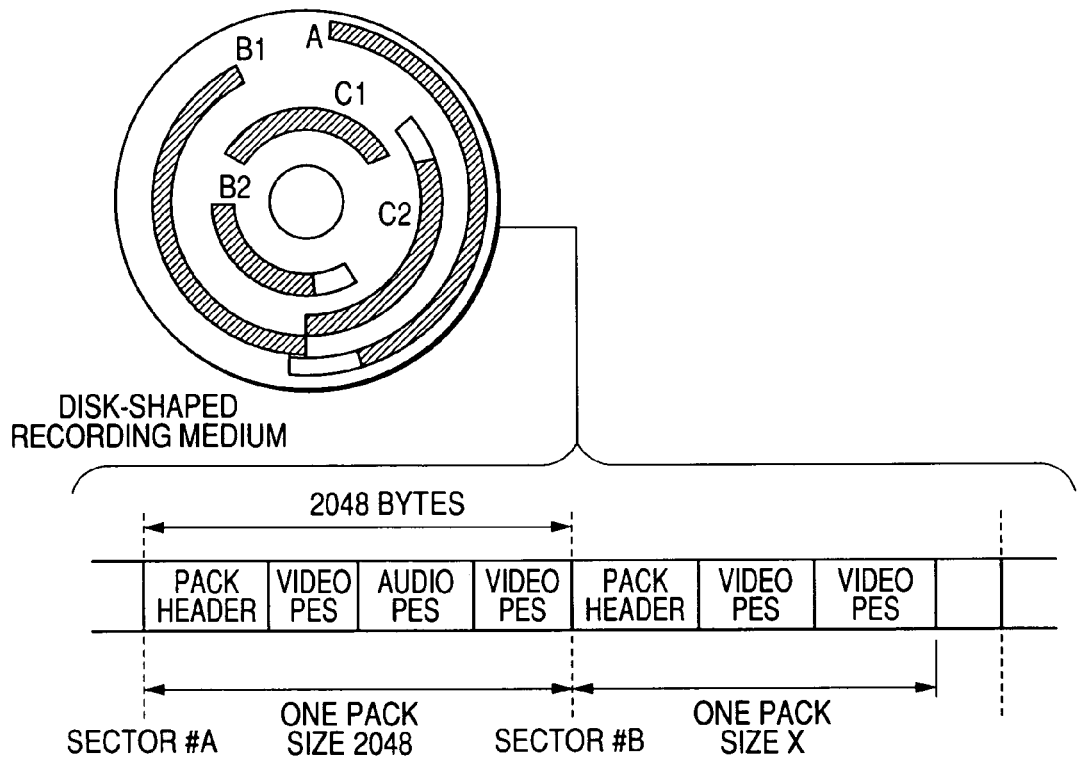
FIG. 16A schematically shows the recording configuration and the data structure of MPEG2-PS recorded on the disk.
FIG. 16B shows the file information of each file shown in FIG. 16A.
Figure 24:
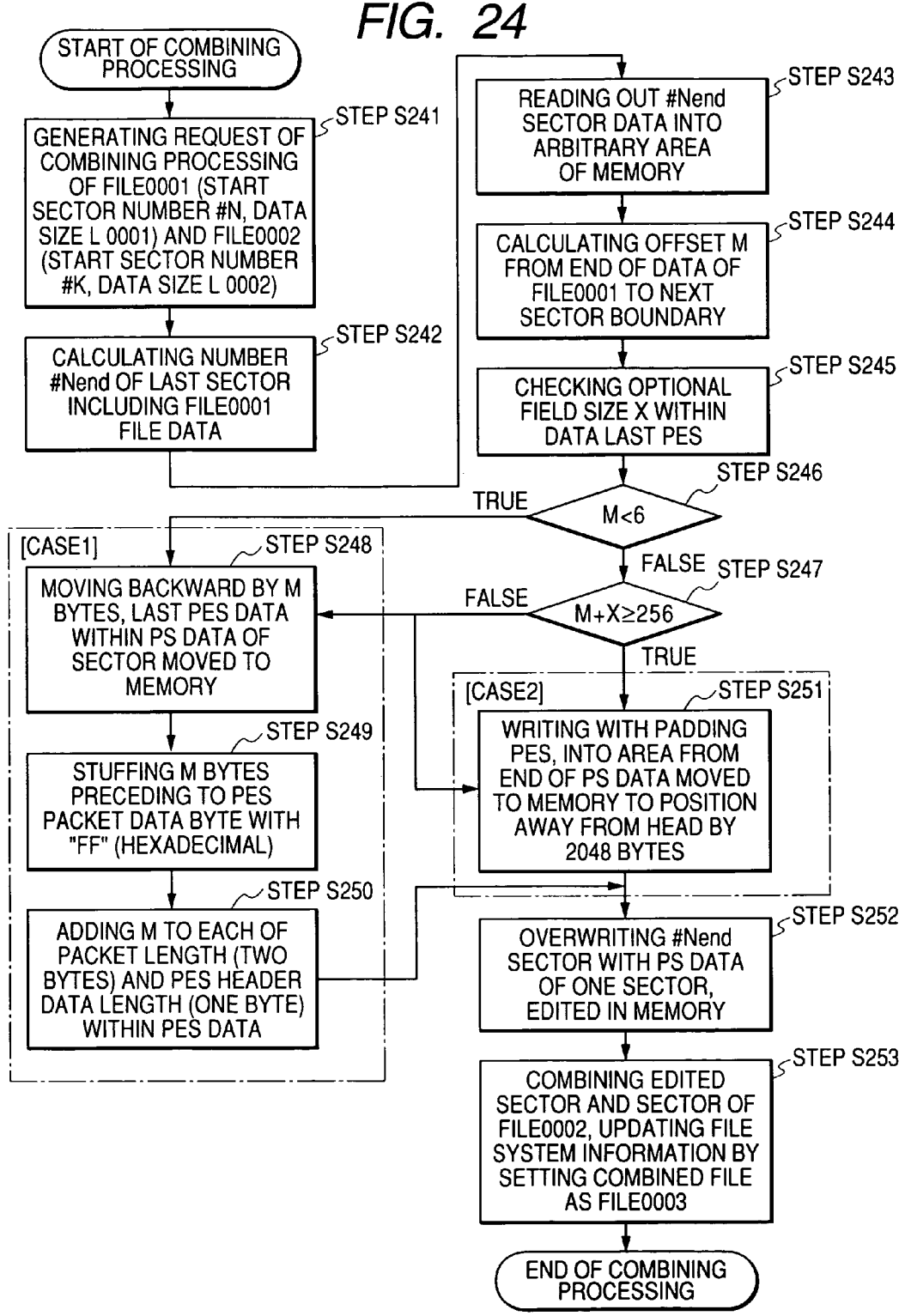
FIG. 24 is a flow chart for explaining the processing of combining the MPEG2-PS data recorded on the disk.

FIG. 16A schematically shows the recording configuration and the data structure of MPEG2-PS recorded on the disk, and FIG. 16B shows the file information of each file on the disk shown in FIG. 16A. FIGS. 17A and 17B to 23A and 23B show an example in which the processing of combining (editing) the MPEG2-PS data is performed, and FIG. 24 is the flow chart illustrating the processing of combining the MPEG2-PS data. Similarly to the first embodiment, the configuration of the disk recording and reproducing system in the second embodiment will be described referring to FIG. 14.

Like an example shown in FIGS. 16A and 16B, when the MPEG2-PS data is written on the disk, the MPEG2-PS data is continuously arranged in each logical block referred to as the sector, or the MPEG2-PS data is discretely arranged on the disk in the case where the continuous unrecorded sector area is not enough. In the embodiment, it is defined that the size of one sector has 2048 bytes.

Similarly to the recording of the MPEG2-TS data, the recording of the MPEG2-PS data is subject to the management constraints of FAT and UDF when the MPEG2-PS data is recorded. The table of the file system information shown in FIG. 17B is provided as the method for managing the MPEG2-PS data recorded on the disk as the file and for constructing the user interface for simply performing the subsequent edit processing.

In the table of FIG. 17B, the file name (user can arbitrary specify) of the MPEG2-PS data to be subjected, the start sector number (position information) indicating from where the data file is actually recorded, and the size of the data started from the start sector number are shown as to the recording data illustrated in FIG. 17A, and each information is managed in connection with one another. This method allows the user to access the desired file only by specifying the file name while the user is not aware of which data is located at which position on the disk.

After the MPEG2-PS data is recorded on the disk in a manner shown in FIGS. 16A and 16B, the processing of combining the data is performed in the disk recording and reproducing apparatus of FIG. 14 having the plurality of pieces of MPEG2-PS data and the file system information in connection with the MPEG2-TS data. The data combining method will be described referring to FIGS. 17A and 17B to 23A and 23B and the flow chart of FIG. 24 in which the procedure of the combining processing is shown.

Figure 18A:
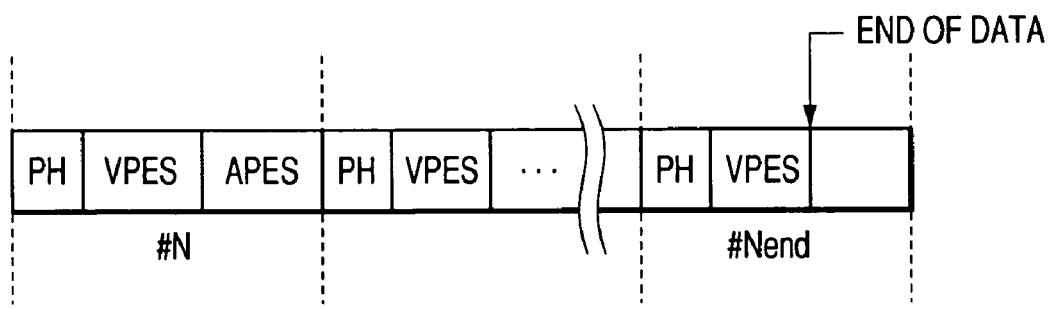
FIG. 18A is a view for explaining the processing of combining the MPEG2-PS data recorded on the disk.

As shown in FIGS. 17A and 17B, there are two MPEG2-PS data files FILE0001 (access start sector Number N and data size of L0001 bytes) and FILE0002 (access start sector Number K and data size of L0002bytes) on the disk. When the request of combining FILE0001 with-FILE0002 to make the data file FILE0003 is generated by the user's command (Step S241 of FIG. 24), as shown in FIG. 18A, the microcomputer calculates the sector number #Nend in which the end of the data FILE0001 exists by the following equation (8) (Step S242 of FIG. 24).

$$\#Nend=\#N+L0001/2048 \quad (8)$$

Figure 18B:
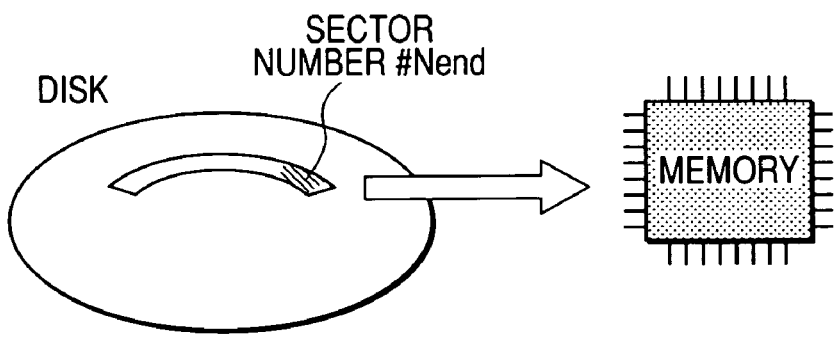
FIG. 18B is a view for explaining the processing of combining the MPEG2-PS data recorded on the disk.

As shown FIG. 18B, the microcomputer reads out the sector data of the sector number #Nend in FILE0001 to an arbitrary area of the memory on the basis of the sector number #Nend determined by the equation (8) (Step S243 of FIG. 24).

Figure 19A:
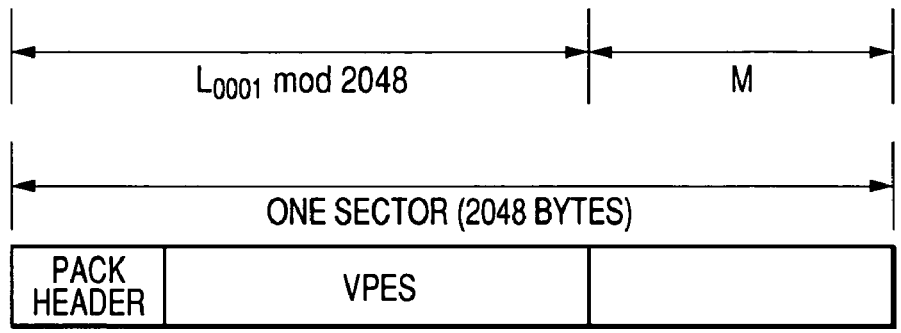
FIG. 19A is a view for explaining the processing of combining the MPEG2-PS data recorded on the disk.

As shown FIG. 19A, the microcomputer determines an offset value M from the end of the data FILE0001 stored in the memory to the end of the sector size of 2048 bytes by the following equation (9) (Step S244 of FIG. 24).

$$M=2048-(L0001 \bmod 2048) \quad (9)$$

Figure 19B:
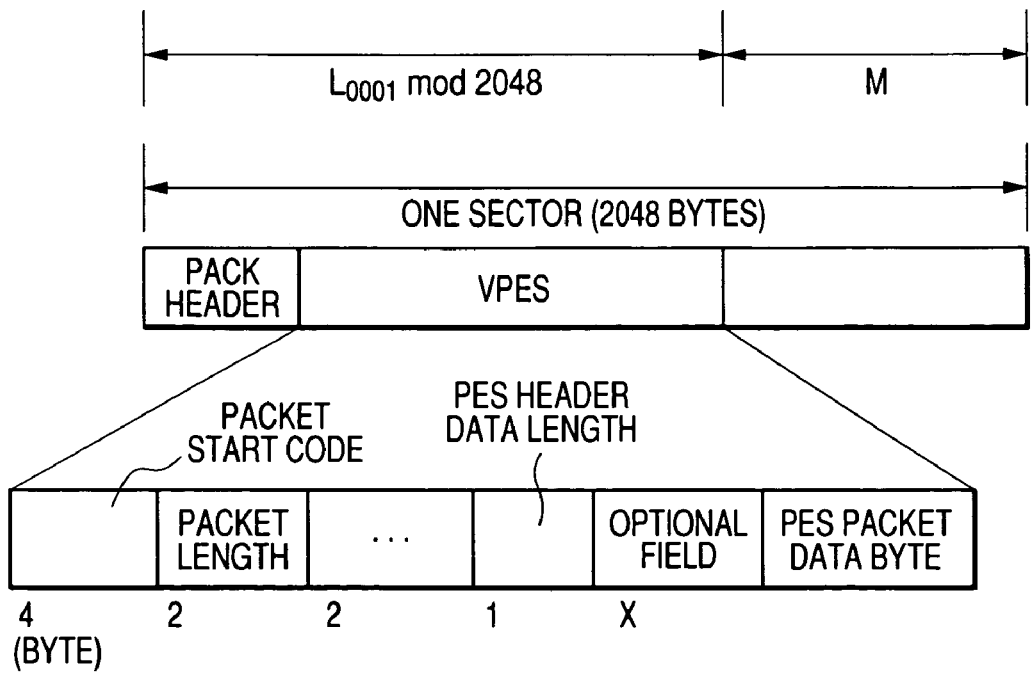
FIG. 19B is a view for explaining the processing of combining the MPEG2-PS data recorded on the disk.

As shown in FIG. 19B, the microcomputer checks an optional field size X in the last PES of the MPEG2-PS data on the basis of a PES header data length in a PES header (Step S245 of FIG. 24).

At this point, the microcomputer decides whether the following equation (10) is true or not (Step S246 of FIG. 24). Further, the microcomputer decides whether the following equation (11) is true or not (Step S247 of FIG. 24), and branches the subsequent processing according to each condition.

$$M<6 \quad (10)$$

$$M+X \geqq 256 \quad (11)$$

With reference to the equations (10) and (11), the value more than 256 can not be set because the PES deader data length is 8 bytes, and the minimum length of PES is 6 bytes, so that the above conditional branch is required. When the equation (10) is true, the microcomputer proceeds to the processing of (Case 1) of Step S248. When the equation (10) is not true and the equation (11) is true, the microcomputer proceeds to the processing of (Case 2) of Step S251. When both the equations (10) and (11) are not true, the microcomputer proceeds to the processing of either (Case 1) or (Case 2).

(Case 1) relates to the padding processing by the dummy data in the PES packet.

Figure 20:
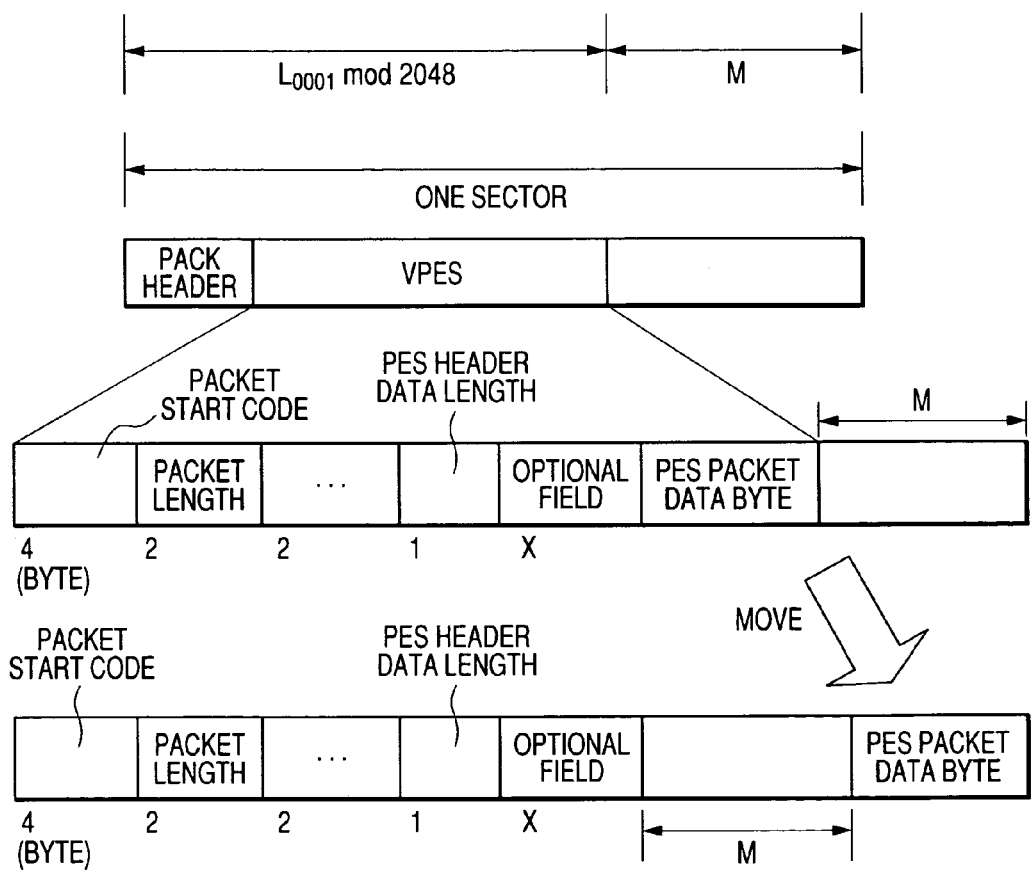
FIG. 20 is a view for explaining the processing of combining the MPEG2-PS data recorded on the disk.
Figure 21:
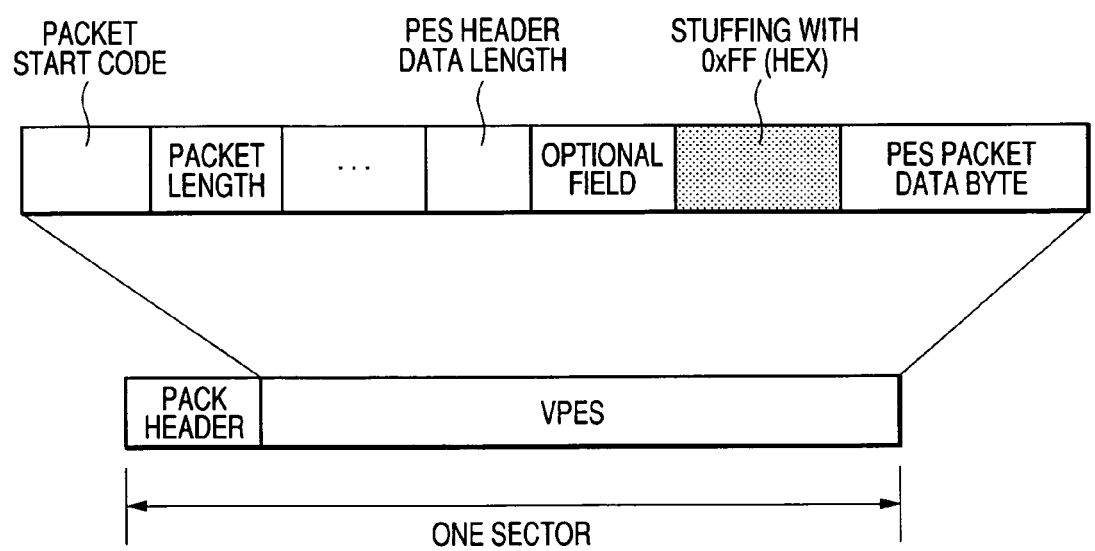
FIG. 21 is a view for explaining the processing of combining the MPEG2-PS data recorded on the disk.

As shown in FIG. 20, the microcomputer reads out the end sector portion of the MPEG2-PS data in the memory and moves the data bytes portion in the final PES into a rearward position of M bytes within the memory (Step S248 of FIG. 24). As shown in FIG. 21, the microcomputer sets M bytes preceding to the moved data bytes to the dummy data and performs stuffing to M bytes with "FF" (hexadecimal) (Step S249 of FIG. 24). Then, the microcomputer adds M to the value of the packet length (2 bytes) within the PES data and the value of the PES header data length (1 byte) according to the following equations (12) and (13) respectively (Step S250 of FIG. 24).

$$\text{packet length after edit=packet length before edit}+M \quad (12)$$

$$\text{PES header data length after edit=PES header data length before edit}+M \quad (13)$$

(Case 2) relates to the padding processing by the padding PES packet.

Figure 22A:
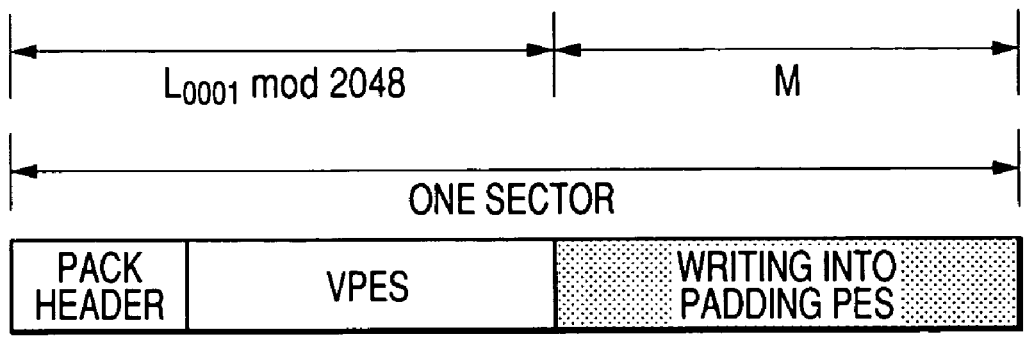
FIG. 22A is a view for explaining the processing of combining the MPEG2-PS data recorded on the disk.

As shown in FIG. 22A, the microcomputer reads out the end sector portion of the MPEG2-PS data in the memory and performs the stuffing to the interval from the end of the data in the memory to the end of the sector size of 2048 bytes with the padding PES of M bytes (Step S251 of FIG. 24).

Figure 22B:
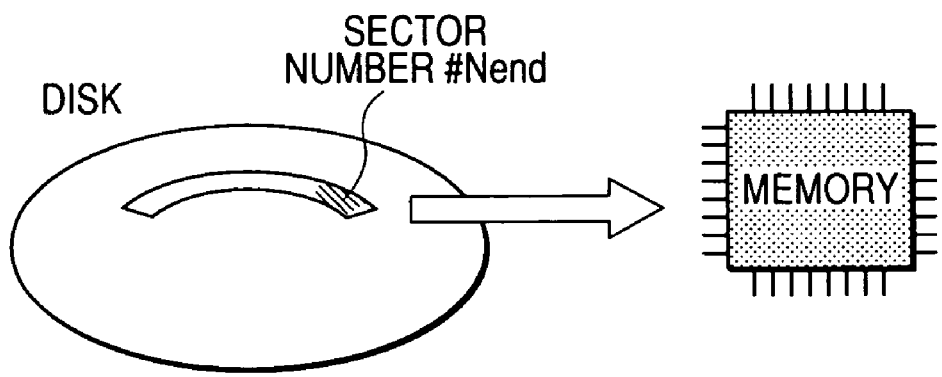
FIG. 22B is a view for explaining the processing of combining the MPEG2-PS data recorded on the disk.

Then, as shown in FIG. 22B, the microcomputer overwrites the sector number #Nend of the disk with the data in the data edited in Step S250 or Step S251 (Step S252 of FIG. 24).

Finally, as shown in FIGS. 23A and 23B, the microcomputer combines FILE0001 (sector number N and data size of L0001+M) including the edited sector and FILE0002 (sector number K and data size of L0002) to set the combined file to FILE0003 and updates the file system information in order to be able to manage FILE0003 by the file system (Step S253 of FIG. 24), and then the combining processing is finished. FILE0003 obtained by the combining processing can be recognized by the file system.

The MPEG2-PS data combining method different from the above-described embodiment will be described below. The configuration in which AV data is registered as the new data file by recording the AV data on the disk will be described, and then the configuration which combines the two data files to edit as one new data file by the recorded data file will be described.

In the disk recording and reproducing apparatus of FIG. 14, in the case where the end of the AV data does not correspond to the sector boundary in the recording the MPEG2-PS data (AV data) which is generated by compressing coding the AV signal such as the image and the speech with MPEG2 or the like, the microcomputer performs the stuffing to the header portion within the final PES packet in the packet having the effective AV data, by the NULL data which is of the dummy data or performs the stuffing by the padding PES packet having the NULL data to performed the recording. The above recording configuration will be described referring to FIG. 15 and FIGS. 25A and 25B to 28A through 28C.

Figure 15:
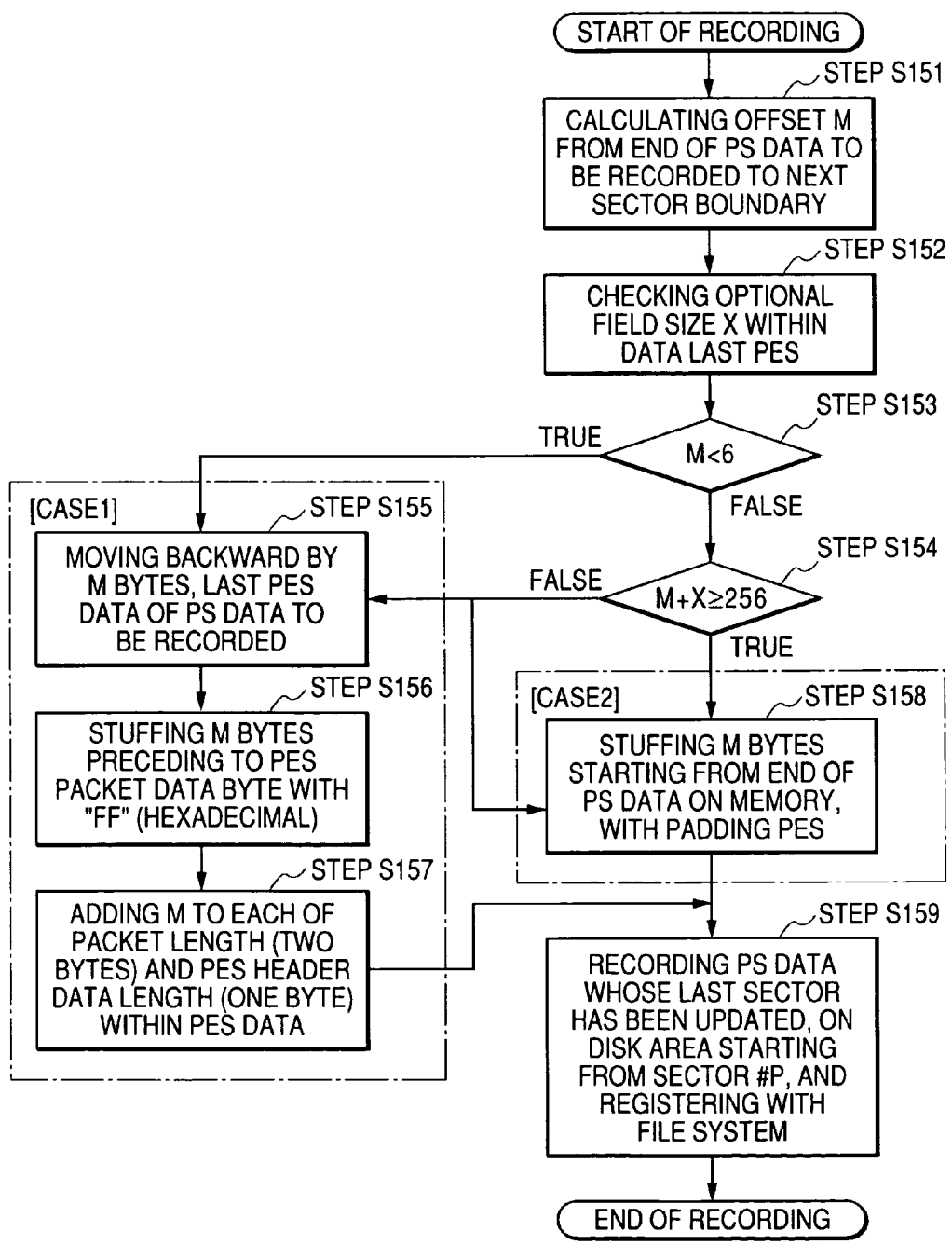
FIG. 15 is a flow chart for explaining steps of recording MPEG2-PS data in a second embodiment.

FIG. 15 is the flow chart showing processing steps of recording the MPEG2-PS data. FIGS. 25A and 25B to 28A and 28B are the view for explaining the MPEG2-PS recording method corresponding to each step in the flow chart shown in FIG. 15.

Figure 25A:
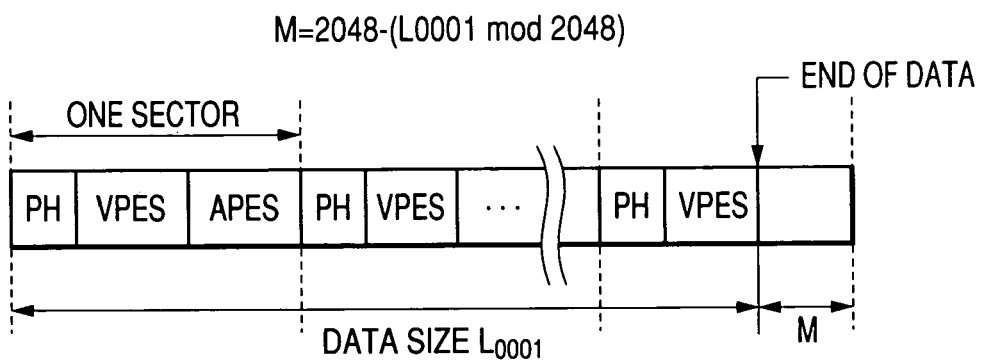
FIG. 25A is a view for explaining the recording steps of the MPEG2-PS data in the second embodiment.

FIG. 25A schematically shows the structure of the data file including the AV data (MPEG2-PS data) recorded on the disk. In the example of FIG. 25A, the end of the AV data does not correspond to the sector boundary.

In the embodiment, in the case where the end of the effective AV data does not correspond to the sector boundary in the recording the MPEG2-PS data shown in FIG. 25A by the disk recording and reproducing apparatus shown in FIG. 14, the disk recording and reproducing apparatus inputs the AV data encoded and multiplexed by the MPEG encoder/decoder in the buffer memory before recording the AV data on the disk included in the data recording and reproducing unit, and the disk recording and reproducing apparatus edits the recording data with the buffer memory to record the AV data. The control is performed by the microcomputer, and the program and the like required for the control are stored in the memory. The recording method will be described in detail below.

As shown in FIG. 25A, the microcomputer calculates the offset value M from the end of the MPEG2-PS data to the next sector boundary by the following equation (14) (Step S151 of FIG. 15).

$$L = 2048 - (L0001 \bmod 2048) \tag{14}$$

Figure 25B:
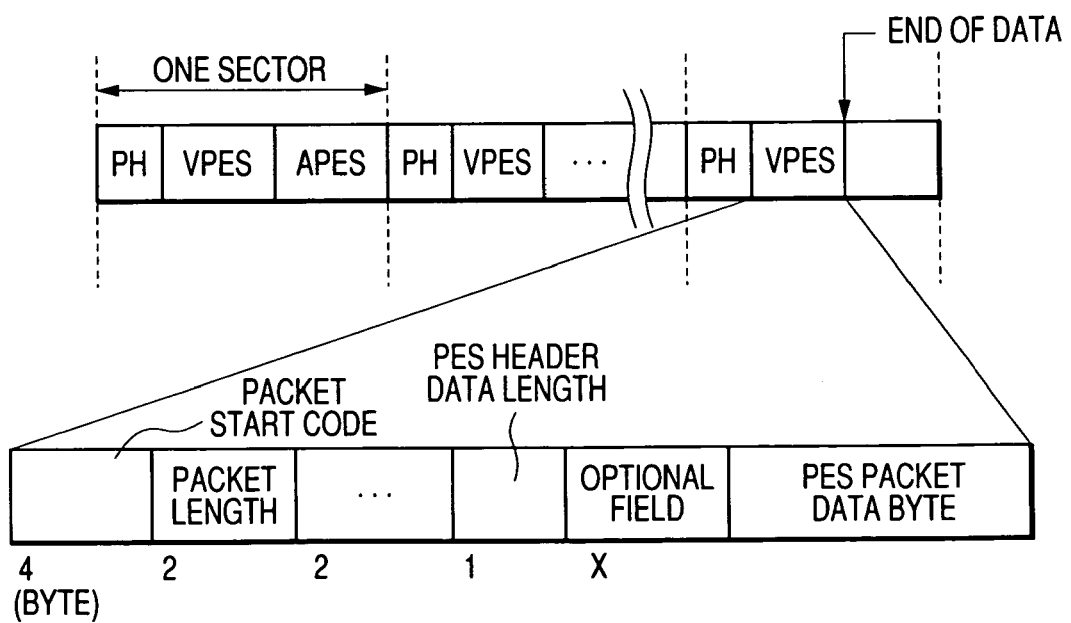
FIG. 25B is a view for explaining the recording steps of the MPEG2-PS data in the second embodiment.

As shown in FIG. 25B, the microcomputer checks the size X of the optional field in the final PES of the MPEG2-PS data on the basis of the PES header data length located in the PES header (Step S152 of FIG. 15).

At this point, the microcomputer decides whether the following equation (15) is true or not (Step S153 of FIG. 15).

Further, the microcomputer decides whether the following equation (16) is true or not (Step S154 of FIG. 15), and branches the subsequent processing according to each condition.

$$M < 6 \tag{15}$$

$$M + X \geq 256 \tag{16}$$

With reference to the equations (15) and (16), the value more than 255 can not be set because the PES header data length is 8 bytes, and the minimum length of PES is 6 bytes, so that the above conditional branch is required. When the equation (15) is true, the microcomputer proceeds to the processing of (Case 1) of Step S155. When the equation (15) is not true and the equation (16) is true, the microcomputer proceeds to the processing of (Case 2) of Step S158. When both the equations (15) and (16) are not true, the microcomputer proceeds to the processing of either (Case 1) or (Case 2). (Case 1) relates to the padding processing by the dummy data in the PES packet.

Figure 26:
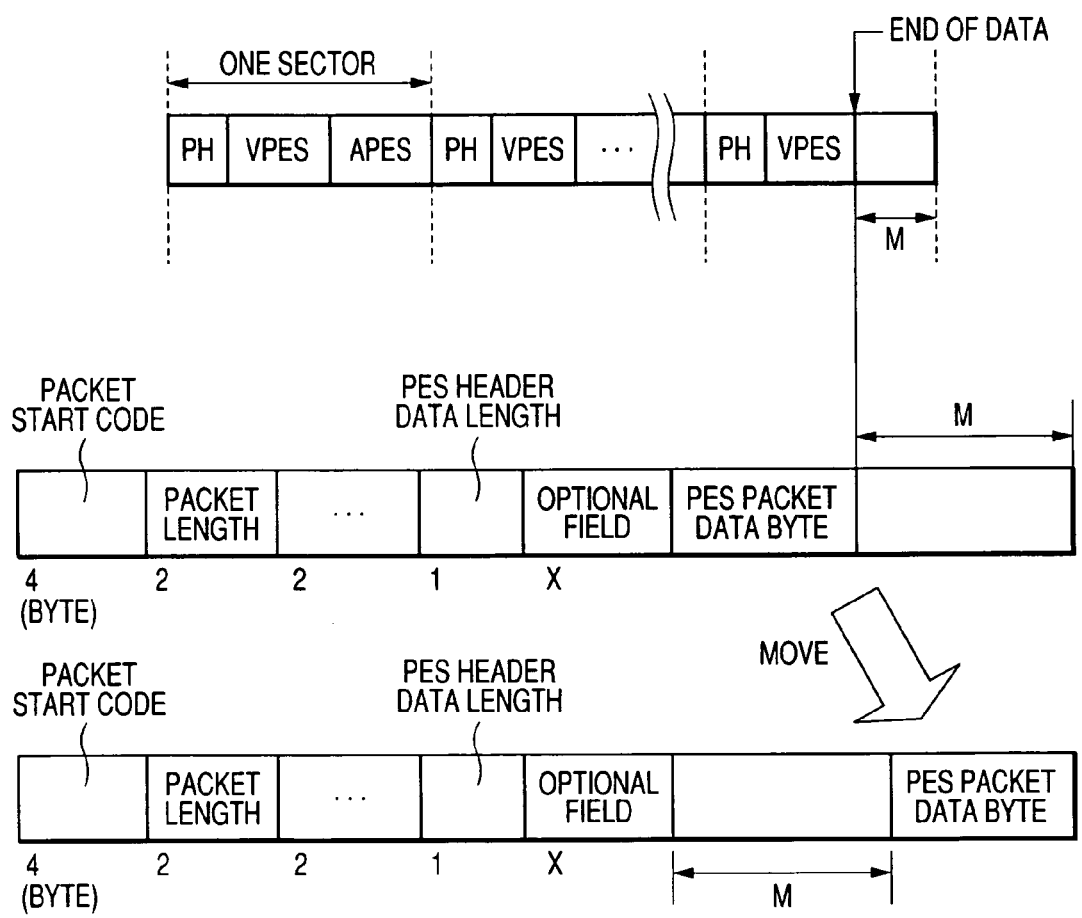
FIG. 26 is a view for explaining the recording steps of the MPEG2-PS data in the second embodiment.
Figure 27:
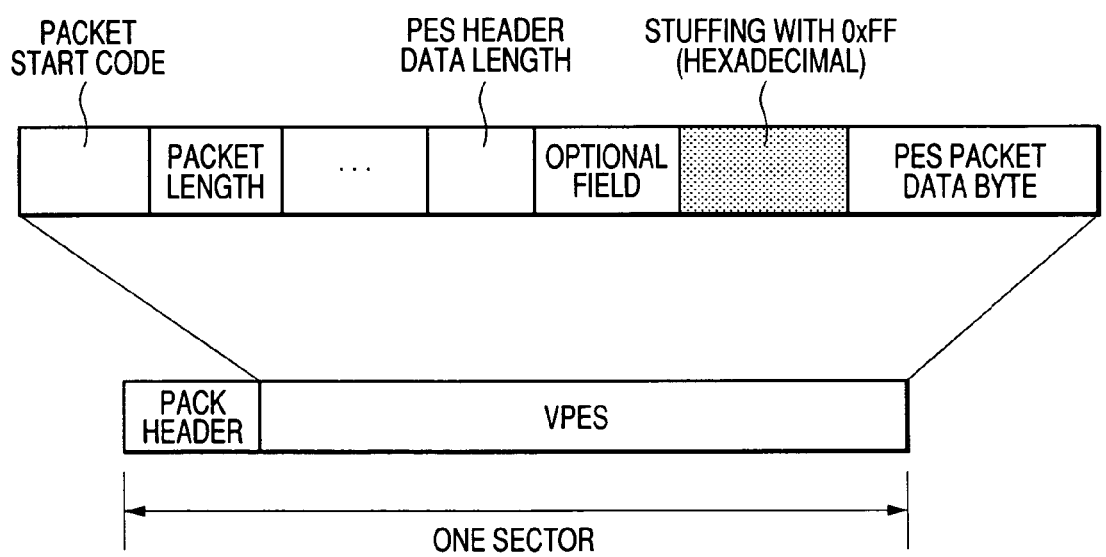
FIG. 27 is a view for explaining the recording steps of the MPEG2-PS data in the second embodiment.

As shown in FIG. 26, the microcomputer moves the data bytes portion in the final PES in the MPEG2-PS data to be recorded to the rearward position of M bytes (Step S155 of FIG. 15). As shown in FIG. 27, the microcomputer performs the stuffing to M bytes with "FF" (hexadecimal) (Step S156 of FIG. 15). Then, the microcomputer adds M to the value of the packet length (2 bytes) within the PES data and the value of the PES header data length (1 byte) according to the following equations (17) and (18) respectively (Step S157 of FIG. 15).

$$\text{packet length after edit} = \text{packet length before edit} + M \tag{17}$$

$$\text{PES header data length after edit} = \text{PES header data length before edit} + M \tag{18}$$

Although the stuffing bytes which are of the dummy data are inserted into the final PES, the same result can be also obtained when PES is inserted in the middle of the AV data.

(Case 2) relates to the padding processing by the padding PES packet.

As shown in FIG. 28A, the microcomputer performs the stuffing with the padding PES of M bytes to the interval from the end of the MPEG-PS data to be recorded to the end of the sector (Step S158 of FIG. 15).

Then, as shown in FIG. 28B, the microcomputer records the MPEG2-PS data to which the padding processing has been performed in Step S157 or Step S158 in the final sector number in order from the sector number #P of the disk, and the microcomputer sets the data file recorded as shown in FIG. 28C to FILE0001 (sector number #P and data size of L0001+M) to register the file system information (Step S159 of FIG. 15).

The recording method was described above. Although the padding PES which is the dummy data is inserted into the end portion of the MPEG2-PS data pack, the same result can be also obtained when the padding PES is inserted in the middle of the AV data.

According to the above configuration, when the end of the effective AV data does not correspond to the sector boundary of the disk, the recorded AV data can be dealt with as the manageable recording data even in the file system by performing the padding to the interval between the end of the effective AV data and the sector boundary by the dummy data within the PES packet or performing the padding by the padding PES packet. The structure of the MPEG2-PS data file generated in the above-described manner is shown in FIGS. 31A and 31B.

The method of combining the MPEG2-PS data recorded on the disk in the above-described manner will be described below referring to FIGS. 29A to 30B.

The case in which the processing request for combining the two MPEG2-PS data files (FILE0001 and FILE0002) recorded on the disk to generate the new file FILE0003 is generated will be described.

Figures 29A, 29B:
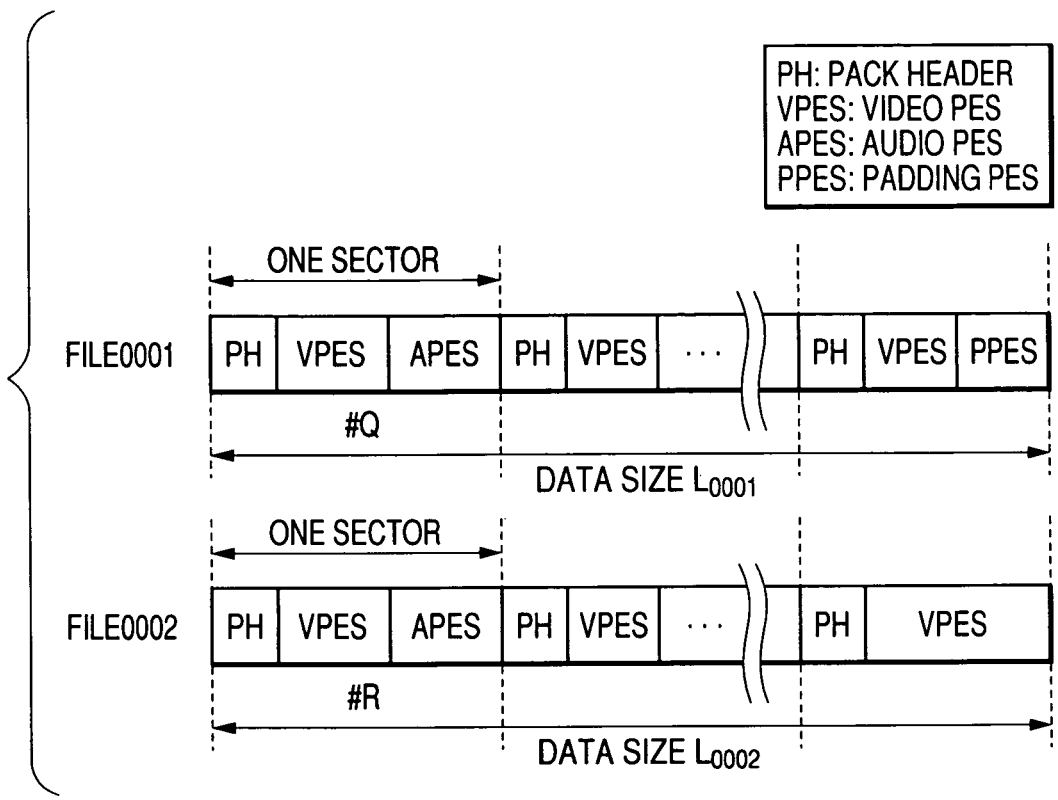
FIG. 29A is a view for explaining the processing of combining the MPEG2-PS data recorded on the disk in the second embodiment.
FIG. 29B shows the file system information of each file shown in FIG. 29A.

There are two MPEG2-PS data files FILE0001 (sector Number Q and data size of L0001 bytes) and FILE0002 (sector Number R and data size of L0002 bytes) recorded on the disk which has the file structure of FIG. 29A and the file system information of FIG. 29B. When the request for combining the two MPEG2-PS data files FILE0001 and FILE0002 to generate the file FILE0003 is generated by the user's command, FILE0003 can be easily generated only by rewriting the file system information as shown in FIG. 30B so that the file sequence is obtained as shown in FIG. 30A.

It is also possible that private data or the like which is formed so as not to decode the data when the data is inputted in the decoder of the MPEG2-PS data is substituted for the NULL data.

The number of combined packets is not limited to the two packets, and the combining processing can be performed to at least three packets.

In the embodiment, the size of one sector is defined as 2048 bytes and the size of one pack is within one sector. However, in the invention, the size of the MPEG2-PS pack is not limited to the above size.

Note that the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, a Blu-ray DISC, and a DVD (a DVD-ROM, a DVD-R and a DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

What is claimed is:

1. An apparatus for recording image data comprising:
a recording unit which records the image data encoded by a predetermined encoding method on a recording medium as recording data having a format including a succession of fixed length packets each having a predetermined data size;
a file management unit which manages, by a file system, recording data recorded on the recording medium; and
an editing control unit which controls editing for combining first recording data and second recording data recorded on the recording medium,
wherein the editing control unit includes:
a first detection unit which detects an offset from an end of one of the first and second recording data to a sector boundary determined depending on the recording medium;
a first recording control unit which generates one or more dummy packets of a same size as the fixed length packet to adjust a positional relationship between the end of one of the first and second recording data and the sector boundary, and records, by the recording unit, the generated dummy packets fully into the offset detected by the first detection unit;
a second detection unit which detects a data size of an excess portion of the dummy packets recorded by the first recording control unit, if the recorded dummy packets exceed the offset; and
a second recording control unit which generates third recording data having a data size N (N being an integer) times as large as the sector size to adjust a positional relationship between the sector boundary and a packet boundary, by adding one or more newly-generated dummy packets, of the same data size as the fixed length packet in accordance with the file system, to the dummy packets of the data size detected by the second detection unit, and records the generated third recording data by the recording unit so that the generated third recording data is combined with said first and second recording data recorded on the recording medium,
wherein the file management unit registers, in the file system, recording data combining information on the basis of a result of the editing, so that information of the first recording data, information of the second recording data, information of the dummy packets recorded by the first recording control unit, and information of the third recording data recorded by the second recording control unit are registered in the file system.

2. An apparatus according to claim 1, further comprising a generating unit which generates the dummy data, when the editing operation is performed.

3. An apparatus according to claim 1, wherein the dummy packet is private data, which conforms to the predetermined encoding method.

4. An apparatus for recording image data comprising:
a recording unit which records a transport stream encoded by an MPEG encoding method on a disk-shaped recording medium as recording data having a format including a succession of fixed length packets each having a predetermined data size;
a file management unit which manages, by a file system, recording data recorded on the disk-shaped recording medium and
an editing control unit which controls editing for combining first recording data and second recording data recorded on the disk-shaped recording medium,
wherein the editing control unit includes:
a first detection unit which detects an offset from an end of one of the first and second recording data to a sector boundary determined depending on the recording medium;
a first recording control unit which generates one or more dummy packets of a same size as the fixed length packet to adjust a positional relationship between the end of one of the first and second recording data and the sector boundary and records, by the recording unit, the generated dummy packets fully into the offset detected by the first detection unit;
a second detection unit which detects a data size of an excess portion of the dummy packets recorded by the first recording control unit, if the recorded dummy packets exceed the offset; and
a second recording control unit which generates third recording data having a data size N (N being an integer) times as large as the sector size to adjust a positional relationship between the sector boundary and a packet boundary, by adding one or more newly-generated dummy packets, of the same data size as the fixed length packet in accordance with the file system, to the dummy packets of the data size detected by the second detection unit, and records the generated third recording data by the recording unit so that the generated third recording data is combined with said first and second recording data recorded on the disk-shaped recording medium,
wherein the file management unit registers, in the file system, recording data combining information on the basis of a result of the editing, so that information of the first recording data, information of the second recording data, information of the dummy packets recorded by the first recording control unit, and information of the third recording data recorded by the second recording control unit are registered in the file system.

5. An apparatus according to claim 4, further comprising a generating unit which generates the dummy data, when the editing operation is performed.

6. An apparatus according to claim 4, wherein the dummy data is private data or null data, which conforms to the transport stream of the MPEG encoding method.

7. A method of recording image data comprising the steps of:

recording data concerning image data encoded by a predetermined encoding method on a recording medium as recording data having a format including a succession of fixed length packets each having a predetermined data size;
managing, by a file system, recording data recorded on the disk-shaped recording medium; and
controlling editing for combining first recording data and second recording data recorded on the disk-shaped recording medium,
wherein the editing control step includes:
a first detection step of detecting an offset from an end of one of the first and second recording data to a sector boundary determined depending on the recording medium;
a first dummy packet recording step of generating one or more dummy packets of a same size as the fixed length packet to adjust a positional relationship between the end of one of the first and second recording data and the sector boundary, and recording the generated dummy packets fully into the offset detected in the first detection step;
a second detection step of detecting a data size of an excess portion of the dummy packets recorded in the first dummy packet recording step, if the recorded dummy packets exceed the offset; and
a second dummy packet recording step of generating third recording data having a data size N (N being an integer) times as large as the sector size to adjust a positional relationship between the sector boundary and a packet boundary, by adding one or more newly-generated dummy packets, of the same data size as the fixed length packet in accordance with the file system, to the dummy packets of the data size detected in the second detection step, and recording the generated third recording data by the recording unit so that the generated third recording data is combined with said first and second recording data recorded on the disk-shaped recording medium,
wherein the management step includes registering, in the file system, recording data combining information on the basis of a result of the editing, so that information of the first recording data, information of the second recording data, information of the dummy packets recorded in the first dummy packet recording unit, and information of the third recording data recorded in the second dummy packet recording step are registered in the file system.

8. A recording medium storing a program for causing a computer to execute, the program comprising the steps of:
recording data concerning image data encoded by a predetermined encoding method on a recording medium as recording data having a format including a succession of fixed length packets each having a predetermined data size; and
managing, by a file system, recording data recorded on the disk-shaped recording medium; and
controlling editing for combining first recording data and second recording data recorded on the disk-shaped recording medium,
wherein the editing control step includes:
a first detection step of detecting an offset from an end of one of the first and second recording data to a sector boundary determined depending on the recording medium;
a first dummy packet recording step of generating one or more dummy packets of a same size as the fixed length packet to adjust a positional relationship between the end of one of the first and second recording data and the sector boundary and recording the generated dummy packets fully into the offset detected in the first detection step;

a second detection step of detecting a data size of an excess portion of the dummy packets recorded in the first dummy packet recording step, if the recorded dummy packets exceed the offset; and a second dummy packet recording step of generating third recording data having a data size N (N being an integer) times as large as the sector size to adjust a positional relationship between the sector boundary and a packet boundary, by adding one or more newly-generated dummy packets, of the same data size as that of the fixed length packet in accordance with the file system, to the dummy packets of the data size detected in the second detection step, and recording the generated third recording data by the recording unit so that the generated third recording data is combined with said first and second recording data recorded on the disk-shaped recording medium, wherein the management step includes registering, in the file system, recording data combining information on the basis of a result of the editing, so that information of the first recording data, information of the second recording data, information of the dummy packets recorded in the first dummy packet recording unit, and information of the third recording data recorded in the second dummy packet recording step are registered in the file system.

* * * * *